(12) United States Patent
Kressin et al.

(10) Patent No.: US 9,622,600 B2
(45) Date of Patent: Apr. 18, 2017

(54) OVER-THE-DOOR HANGING APPARATUS

(71) Applicant: MCS Industries, Inc., Easton, PA (US)

(72) Inventors: Matthew S. Kressin, Allentown, PA (US); Michael Lee Pyle, Sugar Grove, IL (US)

(73) Assignee: MCS Industries, Inc.

( * ) Notice: Subject to any disclaimer, the term of this patent is extended or adjusted under 35 U.S.C. 154(b) by 0 days.

(21) Appl. No.: 15/297,291

(22) Filed: Oct. 19, 2016

(65) Prior Publication Data

US 2017/0035223 A1  Feb. 9, 2017

Related U.S. Application Data

(63) Continuation of application No. 15/084,102, filed on Mar. 29, 2016, now Pat. No. 9,480,350, which is a continuation-in-part of application No. 14/747,656, filed on Jun. 23, 2015, now Pat. No. 9,386,867, which is a continuation-in-part of application No. 14/300,834, filed on Jun. 10, 2014, now Pat. No. 9,060,627, which is a continuation of application No.
(Continued)

(51) Int. Cl.
```
A47F 5/00      (2006.01)
A47G 1/16      (2006.01)
A47G 1/02      (2006.01)
F16B 45/00     (2006.01)
F16M 13/02     (2006.01)
```

(52) U.S. Cl.
CPC ........... *A47G 1/1653* (2013.01); *A47G 1/02* (2013.01); *A47G 1/1606* (2013.01); *F16B 45/00* (2013.01); *F16M 13/022* (2013.01)

(58) Field of Classification Search
CPC .......... F16B 45/00; F16B 47/00; F16B 45/02; F16B 2/22; F16B 47/003; F16B 13/002; F16B 2001/0035; F16B 2/10; F16B 47/006; F16B 5/0685; F16B 11/006; F16B 12/26; F16B 13/0808; F16B 15/00; F16B 2/06
USPC .......... 248/304, 305, 307, 323, 215, 220.21, 248/220.22, 220.41, 220.43, 220.31, 248/225.21, 466, 475.1, 476, 477, 489, 248/495; 211/113, 117
See application file for complete search history.

(56) References Cited

U.S. PATENT DOCUMENTS 2,270,796 A   1/1942   Hauser
3,224,715 A   12/1965  Maggiore
(Continued)

OTHER PUBLICATIONS

Columbia Frame, Instructions to hang mirror over the door, Columbia Frame Inc., 6251, rue Notre-Dame, Montreal, Quebec H1N 2E9, Nov. 23, 2005.

*Primary Examiner* — Steven Marsh
(74) *Attorney, Agent, or Firm* — Belles Katz LLC

(57) ABSTRACT

An apparatus for hanging an article from a door. In one aspect, the apparatus can include a mounting system that can be used to hang a mirror, piece of art, or other article from a door without the need for a screw driver or any other tools. The mounting system may include one or more elongate members that are hung from a top edge of the door and that include mounting elements that mount to separate mounting elements that are secured to the article. The mounting may be achieved via one or more of relative rotation of the elongate members and the article and relative horizontal translation of the elongate members and the article. The inventive apparatus may permit multiple hanging heights for individualized optimization.

20 Claims, 35 Drawing Sheets

Related U.S. Application Data

14/028,839, filed on Sep. 17, 2013, now Pat. No. 8,746,644, which is a continuation of application No. 12/915,747, filed on Oct. 29, 2010, now Pat. No. 8,534,627.

(60) Provisional application No. 62/216,703, filed on Sep. 10, 2015, provisional application No. 61/334,914, filed on May 14, 2010.

(56) References Cited

U.S. PATENT DOCUMENTS

| | | |
|---|---|---|
| 5,485,932 A | 1/1996 | Romm et al. |
| 5,645,178 A | 7/1997 | Conley |
| 6,223,914 B1 | 5/2001 | Snell |
| 6,575,416 B1 | 6/2003 | Avinger |
| 6,854,610 B2 | 2/2005 | Adams |
| 6,857,528 B2 | 2/2005 | Klein et al. |
| 7,188,741 B1 | 3/2007 | Abdi et al. |
| 7,234,671 B2 | 6/2007 | Avinger |
| 8,353,490 B2 | 1/2013 | Spinelli |
| 8,387,838 B2 | 3/2013 | Adams et al. |
| 2005/0189458 A1 | 9/2005 | Avinger |
| 2008/0245751 A1 | 10/2008 | Moran |
| 2011/0253755 A1 | 10/2011 | Adams et al. |

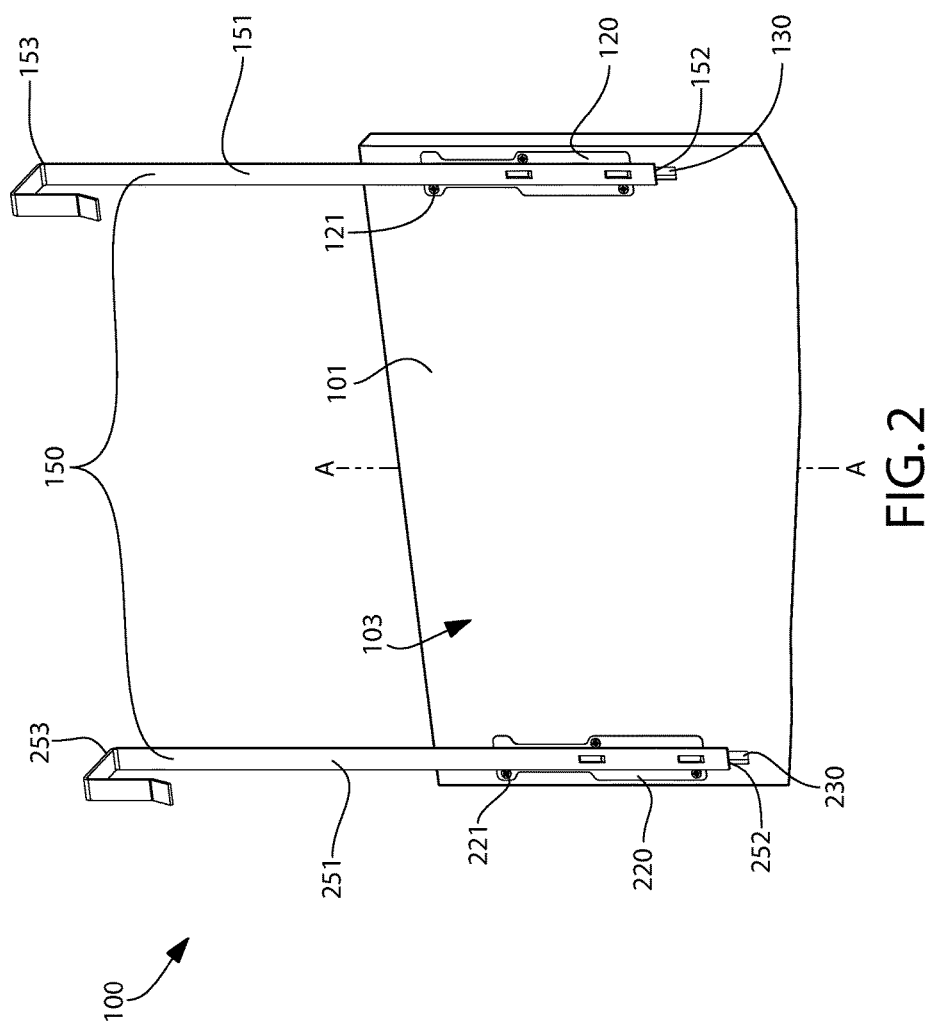

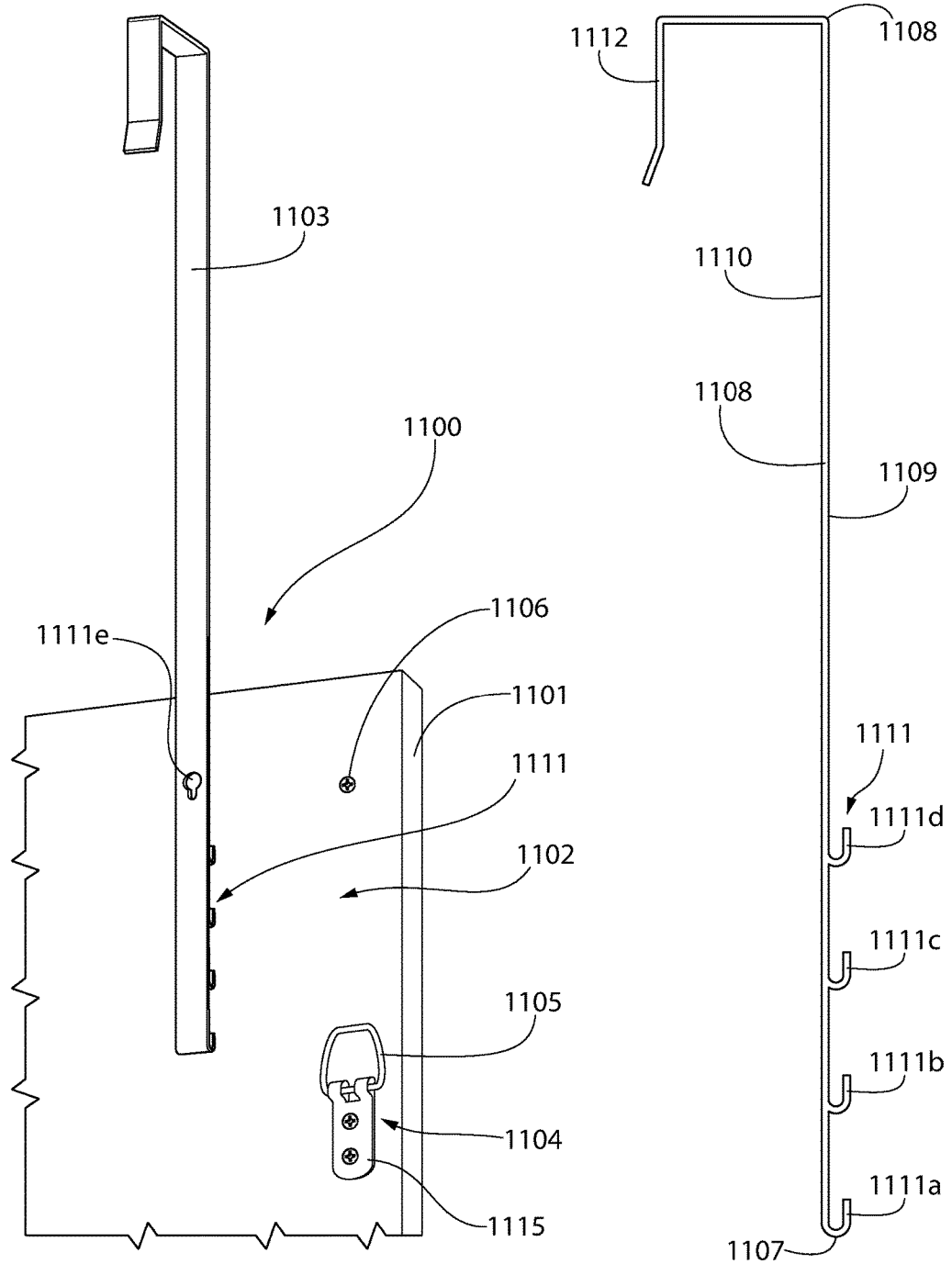

OVER-THE-DOOR HANGING APPARATUS

CROSS-REFERENCE TO RELATED PATENT APPLICATIONS

The present application is a continuation of U.S. patent application Ser. No. 15/084,102, filed Mar. 29, 2016, which: (1) claims the benefit of U.S. Provisional Patent Application Ser. No. 62/216,703, filed Sep. 10, 2015; and (2) is a continuation-in-part of U.S. patent application Ser. No. 14/747,656, filed Jun. 23, 2015, now U.S. Pat. No. 9,386,867, which is a continuation-in-part of U.S. patent application Ser. No. 14/300,834, filed Jun. 10, 2014, now U.S. Pat. No. 9,060,627, which is a continuation of U.S. patent application Ser. No. 14/028,839, filed Sep. 17, 2013, now U.S. Pat. No. 8,746,644, which is a continuation of U.S. patent application Ser. No. 12/915,747, filed Oct. 29, 2010, now U.S. Pat. No. 8,534,627, which claims the benefit of U.S. Provisional Patent Application Ser. No. 61/334,914, filed May 14, 2010. The entirety of each of the above-referenced applications is incorporated herein by reference.

FIELD

The present invention relates to an over-the-door hanging apparatus.

BACKGROUND

Mirrors are used often in everyday life. For example, the first thing that a person does after waking up is go to the bathroom and look at him or herself in the mirror. Furthermore, people also typically look at themselves in the mirror prior to leaving the house to make sure that they are pleased with their appearance. A very common room in the home for a person to desire to have a mirror is in the bedroom or the bathroom. However, there is not always a good place to put a mirror in those rooms. Therefore, it has been known to hang a mirror on a wall or on the back of a door by using adhesives, screws, nails or hangers. Doors have been widely used to support mirrors because they provide convenient available space, because they may be removed to facilitate mounting of the mirror, and because they avoid the necessity of placing wall anchors in plaster or drywall.

In addition to mirrors, people are often desirous to hang other articles or objects on the back of a door in order to conserve space while still enjoying the benefits of the article. For example, people may desire to hang a painting, picture or some other framed article from the back of a door. Depending on the person's needs and the space that the person has available, a person may desire to hang any object that may otherwise be hung or attached to a wall from a door instead.

Typical hangers that enable a user to hang a mirror or other article on the back of a door require a user to assemble the hanger onto the rear of the mirror or other article by screwing, gluing or otherwise attaching the hanger directly onto the rear of the mirror or other article. This type of an installation requires a screw driver or glue, which a user or consumer does not always have available. Furthermore, in the case of a screw-type assembly, even if the user has a screwdriver, the user may find it difficult to force the screw into the rear of the mirror or other article because the mirror or other article typically does not have pilot or pre-drilled holes.

Thus, a need exists for an apparatus and/or system that can be used to hang a mirror, piece of art, or other article to a door without the need for a screw driver or any other tools. A need also exists for an apparatus and/or system that enables a user to hang a mirror, piece of art, or other article from a door in a matter of seconds without the need for excessive physical force and with the ability to adjust its hanging height.

SUMMARY

The present invention may be directed, in one aspect, to an over-the-door hanging apparatus comprising: a support structure extending along a longitudinal axis and having a rear surface; a first mounting element pair coupled to the rear surface of the support structure, the first mounting element pair comprising a first mounting element and a second mounting element, each of the first and second mounting elements comprising a curved channel; a first elongate member comprising a first surface, an opposite second surface, a first mounting element and a second mounting element protruding from the first surface of the first elongate member, and a first bracket protruding from the second surface of the first elongate member for engaging a top edge of a door; the support structure and the first elongate member coupled together by simultaneously: (1) rotating the first mounting element of the first elongate member through the curved channel of the first mounting element of the first mounting element pair; and (2) rotating the second mounting element of the first elongate member through the curved channel of the second mounting element of the first mounting element pair In another aspect, the invention can be an over-the-door hanging apparatus comprising: a support structure extending along a longitudinal axis and having a rear surface; a first mounting element pair coupled to the rear surface of the support structure, the first mounting element pair comprising a first mounting element and a second mounting element, each of the first and second mounting elements comprising a horizontally elongated channel; a first elongate member comprising a first surface, an opposite second surface, a first mounting element and a second mounting element protruding from the first surface of the first elongate member, and a first bracket protruding from the second surface of the first elongate member for engaging a top edge of a door; the support structure and the first elongate member coupled together by: (1) inserting the first mounting element of the first elongate member into the horizontally elongated channel of the first mounting element of the first mounting element pair and inserting the second mounting element of the first elongate member into the horizontally elongated channel of the second mounting element of the first mounting element pair; and (2) horizontally translating one of the first elongate member and the support structure relative to the other so that the first and second mounting elements of the first elongate member move horizontally within the horizontally elongated channels.

In yet another aspect, the invention can be an over-the-door hanging apparatus comprising: a support structure extending along a longitudinal axis and having a rear surface; a mounting bracket coupled to the rear surface of the support structure, the mounting bracket having an upper edge and a lower edge and being elongated in a direction transverse to the longitudinal axis of the support structure; a first elongate member comprising a first surface, an opposite second surface, at least one mounting element protruding from the first surface of the first elongate member, and a first bracket protruding from the second surface of the first elongate member for engaging a top edge of a door; and the support structure slidably mounted to the mounting bracket through mating between the at least one mounting element of the first elongate member and the lower edge of the mounting bracket.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a close-up view of a top portion of the over-the-door hanging apparatus of FIG. 1.

FIG. 3b is a perspective view of the elongate member of FIG. 3a.

FIG. 4b is a front view of the mounting plate of FIG. 4a.

FIG. 14b is a perspective view of the elongate member of FIG. 14a.

FIG. 15b is a front view of the mounting plate of FIG. 15a.

FIG. 18b is a rear perspective view of the elongate member of FIG. 18a.

FIG. 19b is a front view of the mounting plate of FIG. 19a.

FIG. 20 is a cross-sectional schematic of the over-the-door hanging apparatus of FIG. 12 showing the connection between the elongate member of FIG. 18a and the mounting plate of FIG. 19a.

FIG. 22A is a perspective view of a portion of an over-the-door hanging apparatus in accordance with a sixth embodiment of the present invention with an elongate member and a mounting element in a detached state.

FIG. 22B is a side view of the elongate member of FIG. 22A.

DETAILED DESCRIPTION

Figure 1:
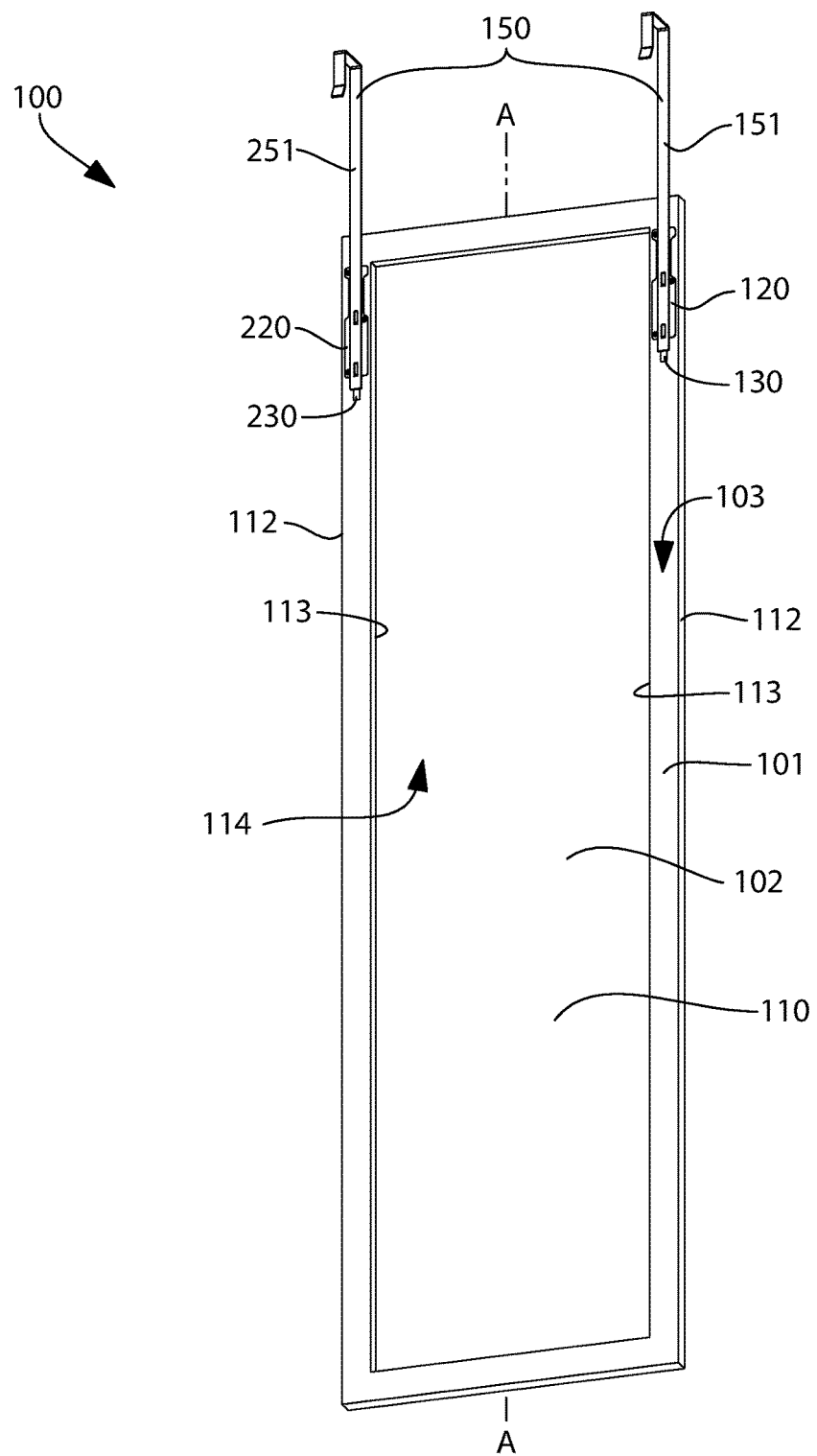
FIG. 1 is a perspective rear view of an over-the-door hanging apparatus in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring to FIGS. 1-2 concurrently, a first embodiment of an over-the-door hanging apparatus 100 is illustrated. The over-the-door hanging apparatus 100 generally comprises a frame 101, a flat article 110 supported within the frame 100, first and second mounting plates 120, 220 secured to a rear surface 103 of the frame 101, and a bracket assembly 150 to which the frame 101 is slidably mounted (as discussed in greater detail below).

In the exemplified embodiment of FIGS. 1 and 2, the frame 101 is a perimeter-type frame comprising an outer edge 112 and an inner edge 113. The inner edge 113 forms a closed-geometry thereby defining a central opening 114. A flat article 110, such as a mirror, is positioned and supported within the central opening 114 according to known mounting techniques. Although the invention will be described with reference to the flat article 110 being a mirror, any other substantially flat article (or article with a substantially flat rear surface) can be used in conjunction with the present invention, including artwork, diplomas, or the like. Furthermore, as used herein, the term "frame" is not limited to a traditional perimeter-type frame having a central opening, but includes frames resembling a simple backer-board or plate that takes up the entire (or a portion of) rear surface area of the article to be mounted thereon. Preferably, however, the desired flat article is displayed by frame 101 so as to be visible to a user when the over-the-door hanging apparatus 100 is hung from a door as described below.

The over-the-door hanging apparatus 100 comprises a first mounting plate 120 and a second mounting plate 220 that are secured to the rear surface 103 of the frame 101 on opposite lateral sides of a vertical centerline A-A. The first and second mounting plates 120, 220 are secured to the frame 101 via screws 121, 221, respectively. Of course, other fasteners and fastening techniques can be used to secure the first and second mounting plates 120, 220 to the frame, including without limitation bolts, nails, rivets, clamps, ties, slot-and-groove mating connections, snap-fit connections, and/or combinations thereof.

The over-the-door hanging apparatus 100 also comprises a bracket assembly 150 to which the frame 101 is detachably mounted. More specifically, the frame 101 is detachably mounted to the bracket assembly through a slidable mating between the first and second mounting plates 120, 220 and the hooks of the bracket assembly 150, which will be described in great detail below. The frame 101 comprises a first channel 130 and a second channel 230 (fully visible in FIG. 5). Only a bottom portion of the first and second channels 130, 230 is visible in FIGS. 1 and 2.

In the exemplified embodiment, the over-the-door hanging apparatus 100 comprises a perimeter-style frame 101, two mounting plates 120, 220 and a bracket assembly 150 that includes a first elongate bracket member 151 and a second elongate bracket member 251. In this embodiment, the two mounting plates 120, 220 are attached to the frame 101 on opposite sides of the vertical centerline A-A of the frame 101 while the first elongate member 151 is slidably attached to the first mounting plate 120 and the second elongate member 251 is slidably attached to the second mounting plate 220. Of course, the invention is not so limited and the over-the-door hanging apparatus 100 may comprise only one mounting plate and one elongate bracket member connected to a central region of the frame 101. Alternatively, the over-the-door hanging apparatus 100 may comprise greater than two mounting plates and a corresponding number of elongate members of the bracket assembly to provide for a more secure connection between the bracket assembly 150 and the frame 101. Moreover, while the first and second elongate bracket members 151, 251 are exemplified as separate structures, it is possible for theses members 151, 251 to be formed as a single construct.

For purposes of referencing direction and orientation of the various components of the over-the-door hanging apparatus 100, it should be noted that relative terms such as top, bottom, left, right, lateral, proximal, distal, upward, outward, inward, vertical, horizontal, and the like are used to delineate relative positions of the components of the inventive over-the-door hanging apparatus 100 with respect to one another and with respect to the vertical centerline A-A and are not intended to be in any further way limiting of the present invention.

Figure 3A:
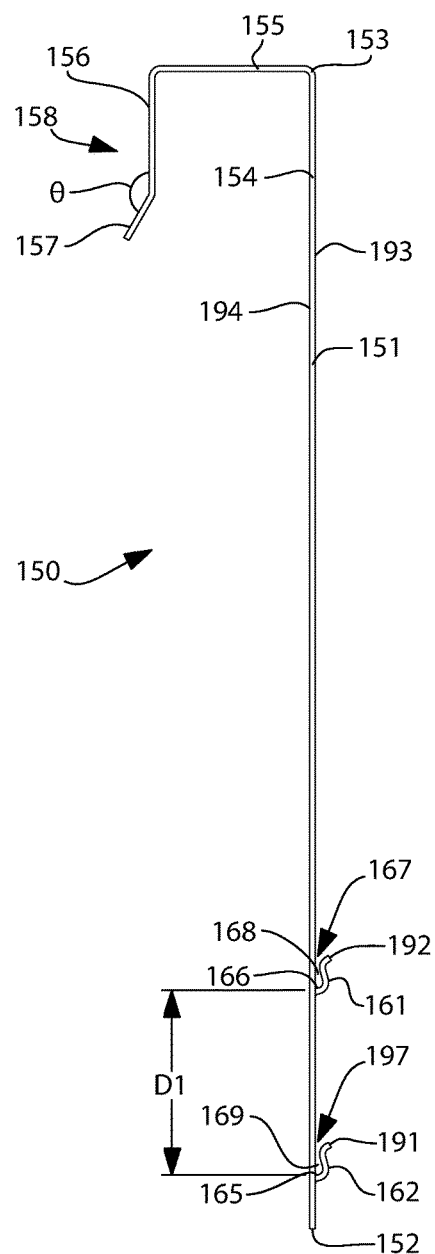
FIG. 3a is a side view of an elongate member of the over-the-door hanging apparatus of FIG. 1.
Figure 3B:
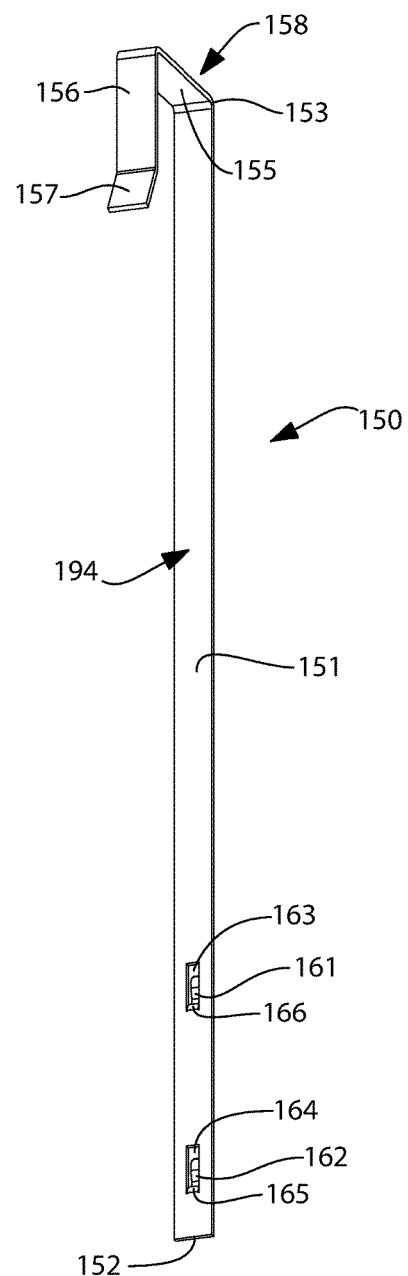

Referring now to FIGS. 2, 3a and 3b concurrently, a detailed description of the bracket assembly 150 will be set forth. The structural details of the elongate bracket members 151, 252 will be discussed herein with respect to the first elongate member 151 with the understanding that the same is applicable to the second elongate member 251 in all respects.

The first elongate member 151 extends from a distal end 152 to a proximal end 153 and comprises a front surface 193 and an opposite rear surface 194. The first elongate member 151 is preferably an integrally formed structure formed by appropriately bending a flat strip of flexible metal, such as a sheet metal. Of course, other materials and formation techniques can be used, including the molding, milling and/or lathing of plastics, matrix materials, or any other material capable of withstanding the required load-bearing requirements. Moreover, while the first elongate member 151 of the bracket assembly 150 is preferably flexible in nature, it may be constructed so as to be substantially rigid if desired.

A generally U-shaped bracket 158 is provided at a proximal end 153 of the first elongate member 151 and extends from the rear surface 194 thereof for sliding over and engaging a top edge of a door. The U-shaped bracket 158 comprises a front portion 154, a top portion 155 and a back portion 156 that terminates with an angled flange 157. The front portion 154 corresponds to a top portion of the elongate member 151 and it encompasses the proximal end 153 of the elongate member 151. The top portion 155 extends outward from the rear surface 194 of the elongate member 151 at the proximal end 153 so as to form an approximately 90 degree angle with the front portion 154 of the U-shaped bracket 158. Although the top portion 155 is described as extending at an approximately 90 degree angle from the front portion 154 of the U-shaped bracket 158, it may extend at other angles if desired. The back portion 156 of the U-shaped bracket 158 extends downwardly from the top portion 155 at an approximately 90 degree angle with the top portion 155, thereby forming the U-shaped bracket 158 of the first elongate member 151 of the bracket assembly 150. The angled flange 157 diverges slightly outward from the back portion 156 at an obtuse angle θ in order to facilitate placement of the U-shaped bracket 158 over a top edge of a door as will be described below with reference to FIG. 8.

The U-shaped bracket 158 is preferably made of a flexible material so that it can bend and more easily fit over doors with varying widths. In other words, it is preferable that a user is able to extend the distance between the back portion 156 and the front portion 154 of the U-shaped bracket 158 by applying an outward force on the flange 157. The top portion 155 of the U-shaped bracket 158 is made wide enough to accommodate a conventional door width which the inventive bracket assembly 150 is to be used. The thickness of the material, and hence its flexibility, must be chosen so that the U-shaped bracket 158 is sufficiently rigid to avoid deformation under the load of the flat article 110 and yet is thin enough to fit over the top of the door without creating clearance problems with respect to the cap of the door frame. In use, a user may grip and pull on the flange portion 157 of the U-shaped bracket 158 of the bracket assembly 150 in order to assist with the attachment of the bracket assembly 150 to the top edge of a door as will be described in detail below with reference to FIG. 11.

The first elongate member 151 further comprises a top hook 161 and a bottom hook 162 near the distal end 152 of the elongate member 151. The top hook 161 and the bottom hook 162 collectively form a pair of hooks and are often referred to as such throughout this application. In the exemplified embodiment, the top and bottom hooks 161, 162 are integrally formed with the first member 151. More specifically, the top and bottom hooks 161, 162 are preferably formed by punching an appropriate pattern in the first elongate member 151 and subsequently bending the in-plane tab out of plane and into the desired shape. As a result, apertures 163, 164 (i.e. holes) are formed in the elongate member 151 behind the hooks 161, 162. The apertures 163, 164 enable the elongate member 151 to be manufactured with less material and also prevent the elongate member 151 from prematurely deteriorating due to the friction of the mounting plates 120, 220 against the hooks 161, 162. Of course, the apertures 163, 164 need not be included as a part of the elongate member 151 and the hooks 161, 162 can be separate structures that are subsequently welded, fastened, clamped or otherwise connected to the first elongate member 151.

The top and bottom hooks 161, 162 each extend outwardly from the front surface 193 of the elongate member 151 and upwardly toward the proximal end 153. The top hook 161 extends from a base 166 at which it connects to the elongate member 151 to a distal end 192 at which it terminates. Similarly, the bottom hook 162 extends from a base 165 at which it connects to the elongate member 151 to a distal end 191 at which it terminates. The top and bottom hooks 161, 162 are preferably in a linear vertical alignment with one another on the front surface 193 of the elongate member 151. The hooks 161, 162 each have a length which is equal to the distance from the bases 165, 166 to the distal ends 191, 192 of the hooks 161, 162, respectively. The base 166 of the top hook 161 is spaced a distance D1 from the base 165 of the bottom hook 162, the importance of which will become apparent from the description below with reference to FIGS. 4a and 4b.

The top and bottom hooks 161, 162 are preferably S-shaped tabs. The S-shape of the top and bottom hooks 161, 162 are preferred in order to accomplish an efficient attachment between the bracket assembly 150 and the mounting plates 120, 220 as will be described below. The invention, of course, is not limited by the shape of the hooks and other shapes may be used as would be known to persons skilled in the art. For example, the top and bottom hooks 161, 162 could simply be straight tabs extending outwardly in an angled fashion from the bracket assembly 150 for slidable mating with the edges of the mounting plates as described below. Furthermore, it should be understood that the term hooks is intended to include any tab-type structure that may extend outwardly from the bracket assembly 150 in a manner that affords slidable mating with the edges of the mounting plates 120, 220 and is not intended to be in any other way limiting of the present invention.

Both of the top and bottom hooks 161, 162 extend outwardly and upwardly from the front surface 193 of the elongate member 151 in a spaced part manner so that slots 168, 169 are formed between the hooks 161, 162 and the front surface 193 of the elongate member 151. Both of the slots 168, 169 have an open top end 167, 197 that provides access into the slots 168, 169 so that the edges of the mounting plates can be lowered into the slots 168, 169 during mounting of the frame 101 to the bracket assembly 150, which will be described in greater below with reference to FIG. 6.

Figure 4A:
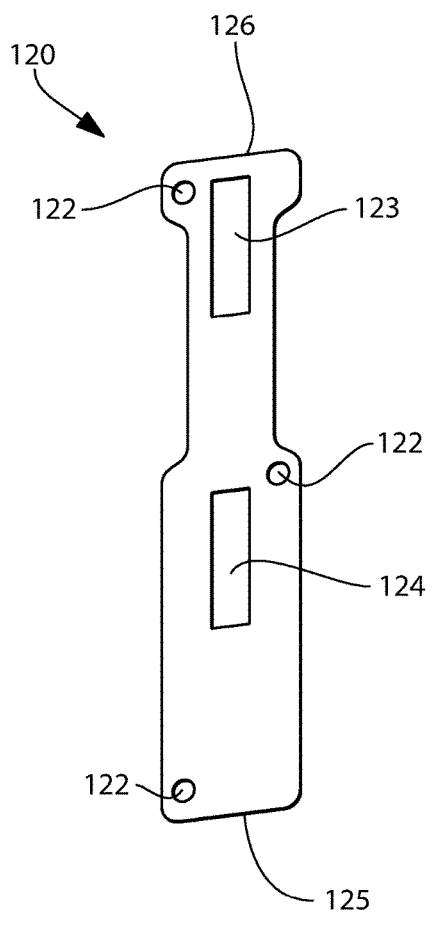
FIG. 4a is a perspective view of a mounting plate of the over-the-door hanging apparatus of FIG. 1.
Figure 4B:
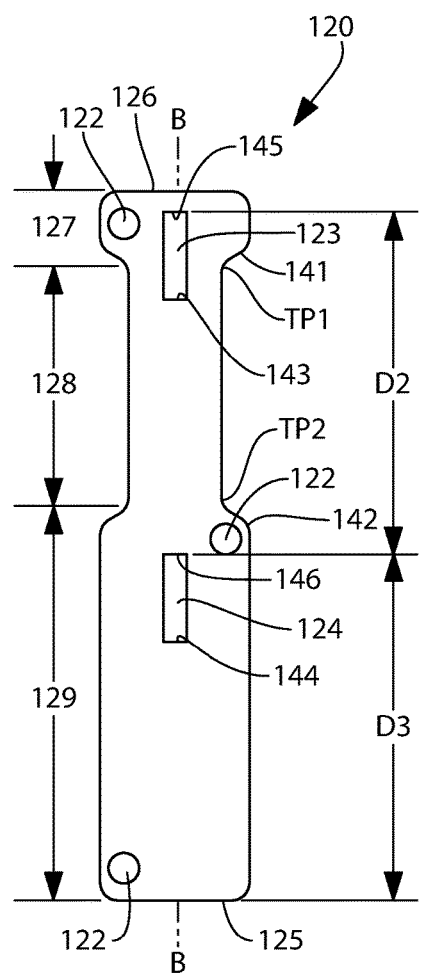

Referring now to FIGS. 4a and 4b, the details of the mounting plates 120, 220 of the present invention will be described. Similarly to the description of the elongate members 151, 251 above, only the first mounting plate 120 will be described in detail with the understanding that the discussion is applicable to the second mounting plate 220.

The first mounting plate 120 is preferably a flat plate that can be secured to the frame 101 by any of the techniques described above. The first mounting plate 120 comprises a plurality of screw holes 122 that are sized and configured to receive a screw to facilitate the attachment of the first mounting plate 120 to the frame 101. Although the first mounting plate 120 is illustrated having three screw holes 122, the invention is not so limited and the first mounting plate 120 may have more or less than three screw holes 122 as desired. When attached to the frame 101, a rear surface (not shown) of the first mounting plate 120 is in surface contact with the rear surface 103 of the frame 101 by nature of their opposing flat surfaces.

The first mounting plate 120 is preferably a flat plate that is substantially free of contour for the entirety of its major planar surfaces. The first mounting plate 120 has an overall perimeter shape such that its cross-sectional area changes throughout its length. The first mounting plate 120 has a bottom edge 125, a top edge 126 and two vertical sides that collectively form the perimeter of the first mounting plate 120. The first mounting plate 120 also comprises a vertical axis B-B that is substantially transverse to and intersects the bottom and top edges 125, 126 of the first mounting plate 120. A top section 127 of the first mounting plate 120 extends from the top edge 126 of the first mounting plate 120 to a transition point TP1. A middle section 128 of the first mounting plate 120 extends from the transition point TP1 to a transition point TP2. A bottom section 129 of the first mounting plate 120 extends from the transition point TP2 to the bottom end 125 of the first mounting plate 120. The cross-sectional area of the top section 127 of the first mounting plate 120 gradually decreases from a point 141 in the top section 127 to the transition point TP1. The middle section 128 of the first mounting plate 120, which extends from the transition point TP1 to the transition point TP2, has a constant cross-sectional area throughout its length. The cross-sectional area of the bottom section 129 of the first mounting plate 120 gradually increases from the transition point TP2 to a point 142. The cross-sectional area of the first mounting plate 120 is again constant from the point 142 of the bottom section 129 of the first mounting plate 120 to the bottom edge 125 of the first mounting plate 120. The shape of the first mounting plate 120 provides the first mounting plate 120 with a structural rigidity while using a minimized amount of materials in order to reduce the costs in manufacturing.

In the illustrated embodiment, the first mounting plate 120 comprises a top aperture 123 and a bottom aperture 124. The top aperture 123 is positioned partially within both of the top and middle sections 127, 128 while the bottom aperture 124 is positioned within the bottom section 129 only. Although the invention is described with a plate having two apertures, the first mounting plate 120 may have only one aperture or more than two apertures as would be understood by a person skilled in the art. Furthermore, the apertures 123, 124 may be positioned on other locations on the first mounting plate 120 as desired. Using more apertures will enable additional adjustability to the hanging height of the article as will be described below. The apertures 123, 124 in the first mounting plate 120 are preferably rectangular in shape, but may take on any other shape as desired.

The top aperture 123 is defined by a closed-geometry edge that includes a top edge 145 and a bottom edge 143. Similarly, the bottom aperture 124 is defined by a closed-geometry edge that includes a top edge 146 and a bottom edge 144. The top edge 145 of the top aperture 123 is spaced a distance D2 from the top edge 146 of the bottom aperture 124, measured along the linear axis B-B. Similarly, the top edge 146 of the bottom aperture 124 is spaced a distance D3 from the bottom edge 125, measured along the axis B-B. The first mounting plate 120 is designed so that the distance D2 is substantially equal to the distance D3. Furthermore, both of these distances D2, D3 are also substantially equal to the distance D1 between the hooks 161, 162 (discussed above with respect to FIGS. 3a, 3b). The importance of the edges 145, 146, 125, and the distances D1, D2, D3 will become apparent from the description below with reference to FIG. 5.

Figure 5:
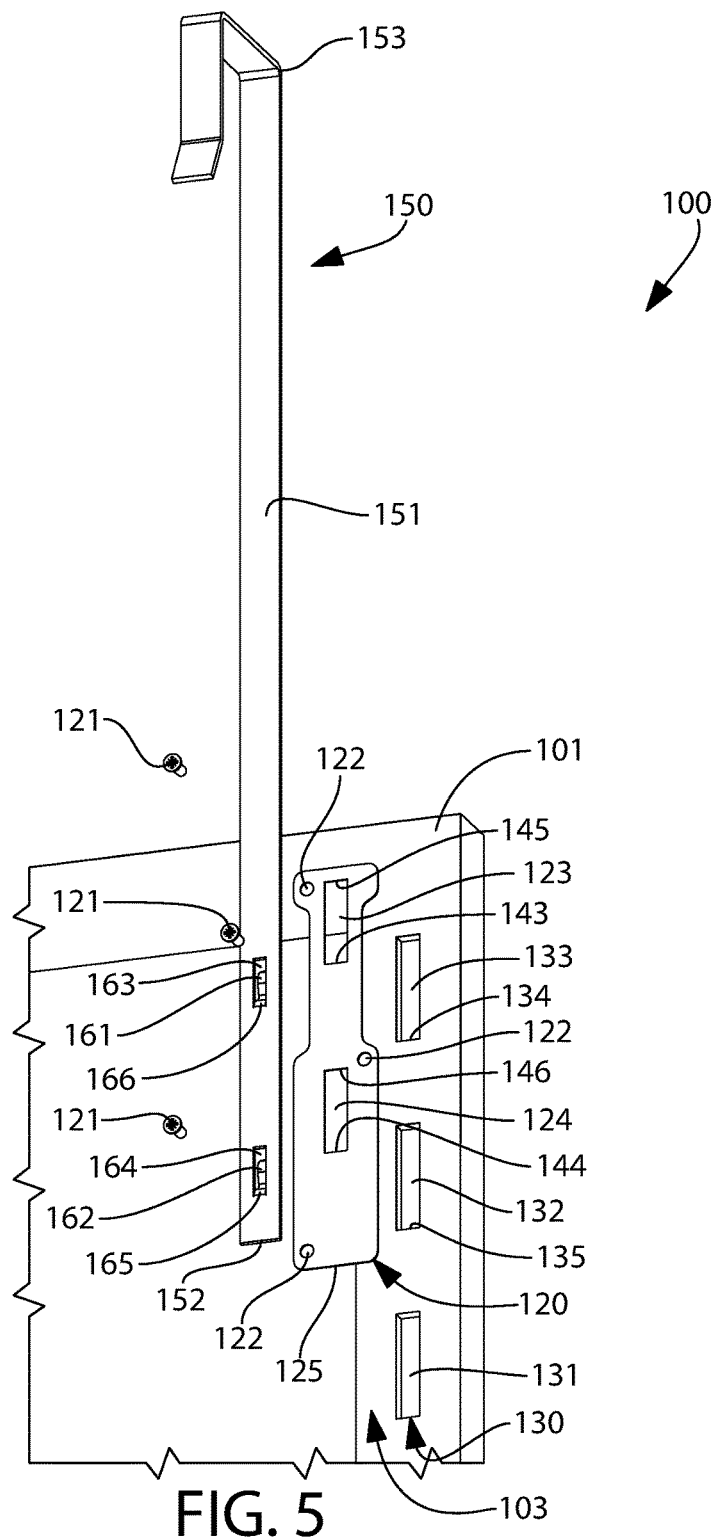
FIG. 5 is an exploded perspective view of a portion of the over-the-door hanging apparatus of FIG. 1.

Referring now to FIG. 5, a portion of the over-the-door hanging apparatus 100 is illustrated in an exploded state. As can be seen, the frame 101 comprises has a first channel 130 formed into the rear surface 103 on one side of the vertical centerline A-A of the frame 101 along the right lateral (another one of the channels is provided on the opposite side of the vertical centerline A-A). In the exemplified embodiment of FIG. 5, the channel 130 is illustrated as a segmented channel 130 comprising a first channel segment 131, a second channel segment 132 and a third channel segment 133.

As noted above, FIG. 5 illustrates the channel 130 as comprising a first channel segment 131, a second channel segment 132 and a third channel segment 133. However, more than three channel segments may be used as desired for further adjustability in the hanging height of the over-the-door hanging apparatus 100 as will be described below. Furthermore, the frame 101 may be configured with less than three channel segments and still be used as described below as would be understood by a person skilled in the art.

Each of the channel segments 131-133 of the channel 130 is a rectangular shaped depression formed into the frame 101. The channel segments 131-133 of the channel 130 each form a groove or trough within the rear surface 103 of the frame 101 that comprises a floor and, thus, do not extend through the entire thickness of the frame 101. However, in alternative embodiments, one or more of the channel segments 131-133 of the channel 130 may be through-holes in the sense that they could extend all the way through the thickness of the frame 101. Of course, the channel segments 131-133 are contemplated as taking on any other shapes, including without limitation circles, triangles, trapezoids or the like.

Figure 7:
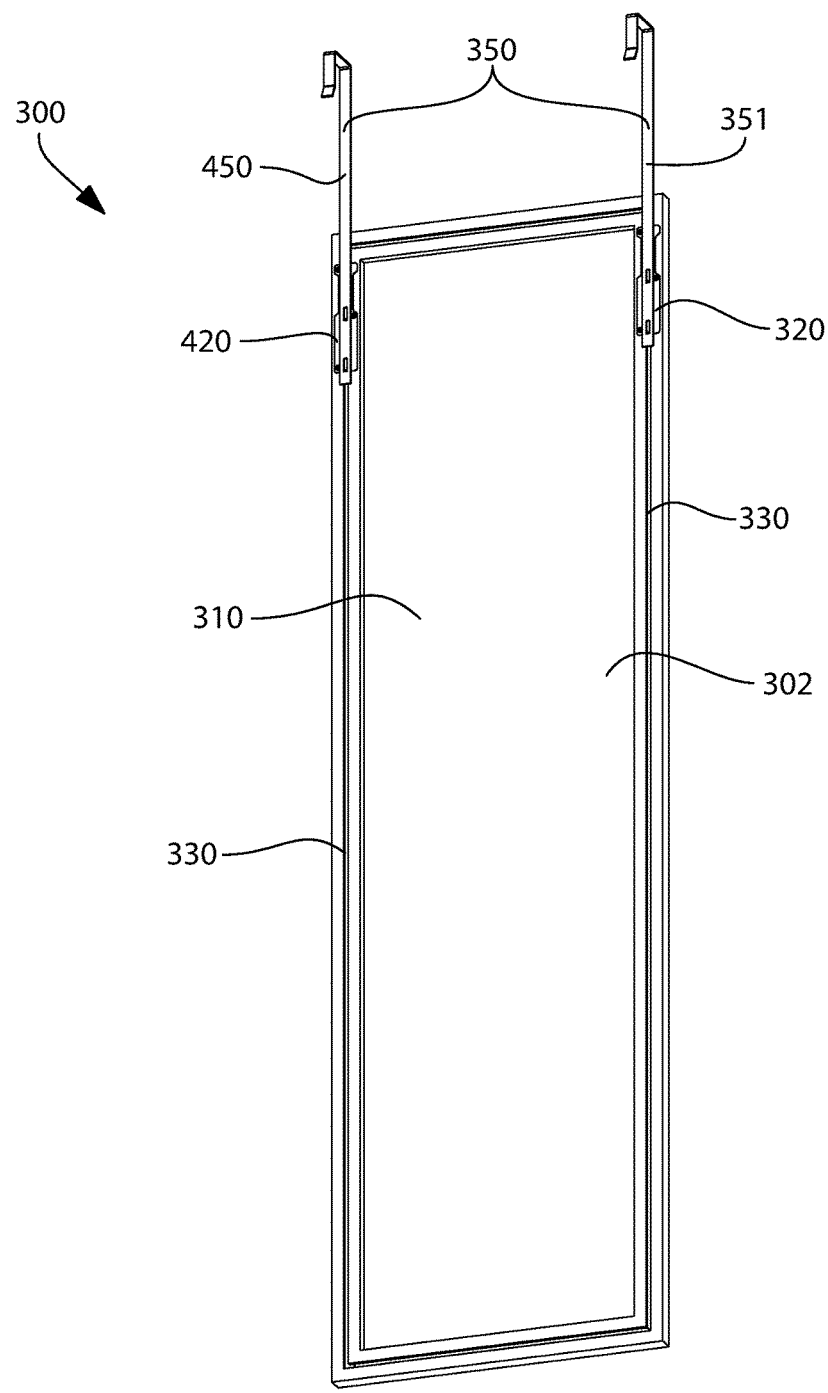
FIG. 7 is a perspective rear view of an over-the-door hanging apparatus in accordance with a second embodiment of the present invention.
Figure 8:
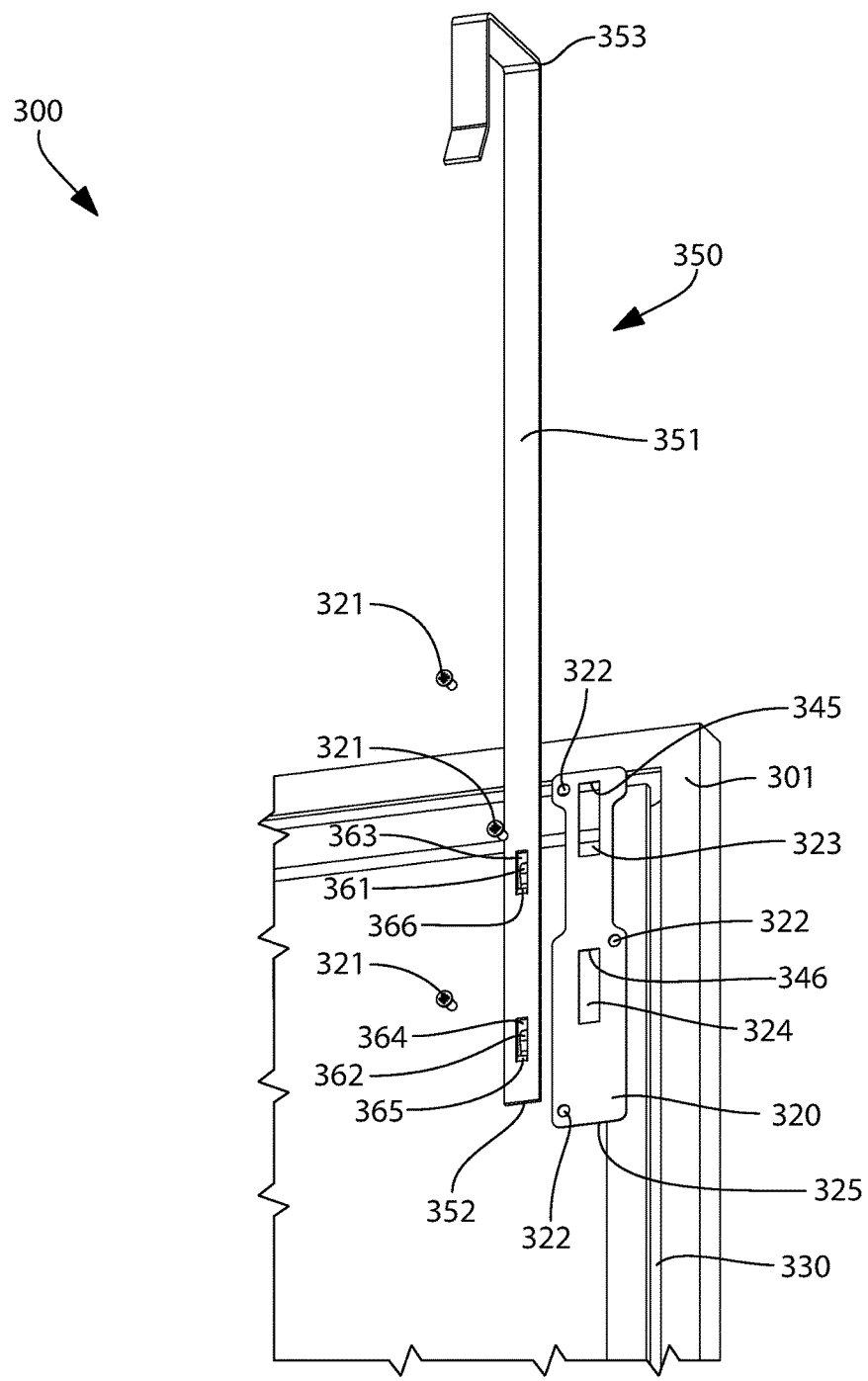
FIG. 8 is an exploded perspective view of a portion of the over-the-door hanging apparatus of FIG. 7.
Figure 9:
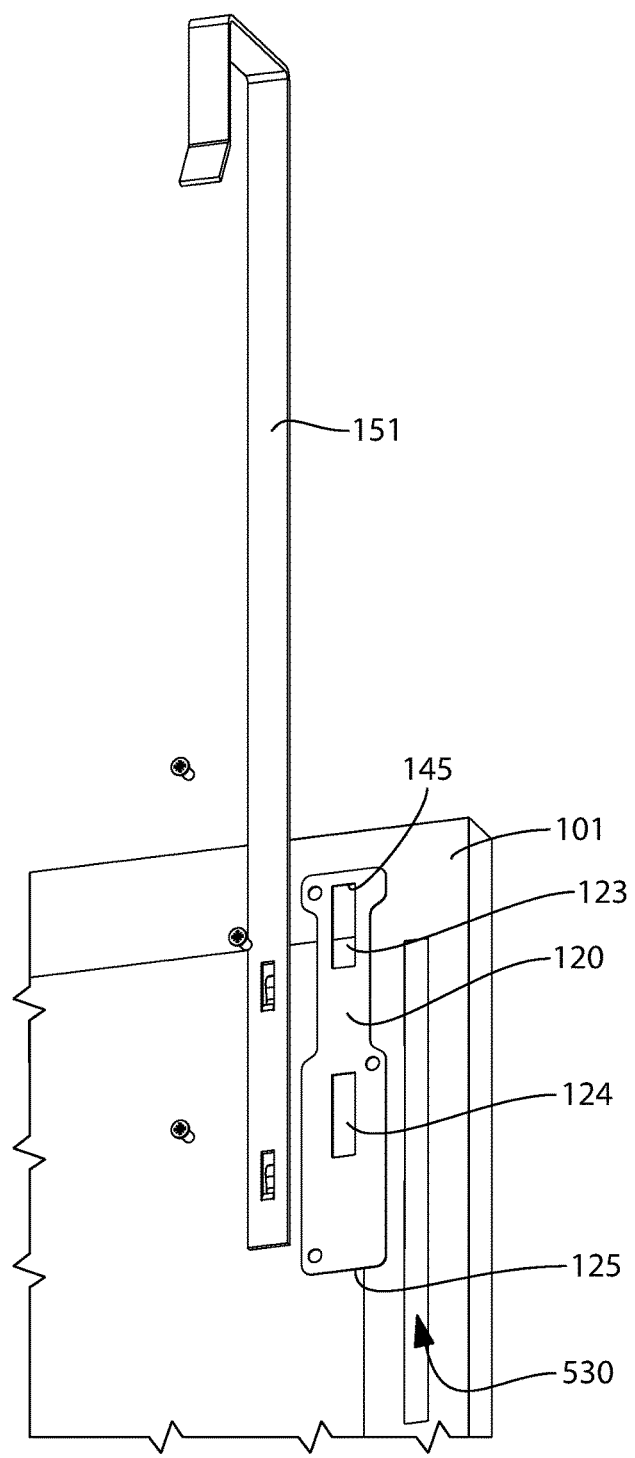
FIG. 9 is an exploded view of the portion of the over-the-door hanging apparatus of FIG. 7 in accordance with an alternative embodiment.

Furthermore, while the channel 130 is exemplified as a segmented channel, the invention is not so limited and the channel 130 may be a singular continuous annular channel that extends around the entire perimeter of the rear surface 103 of the frame 101 or can be a continuous channel that extends from below the bottom edge 125 of the first mounting plate 120 to above the top edge 145 of the top aperture 123 of the first mounting plate 120. These alternative embodiments are shown in FIGS. 7-9 and will be described in greater detail below.

Figure 6:
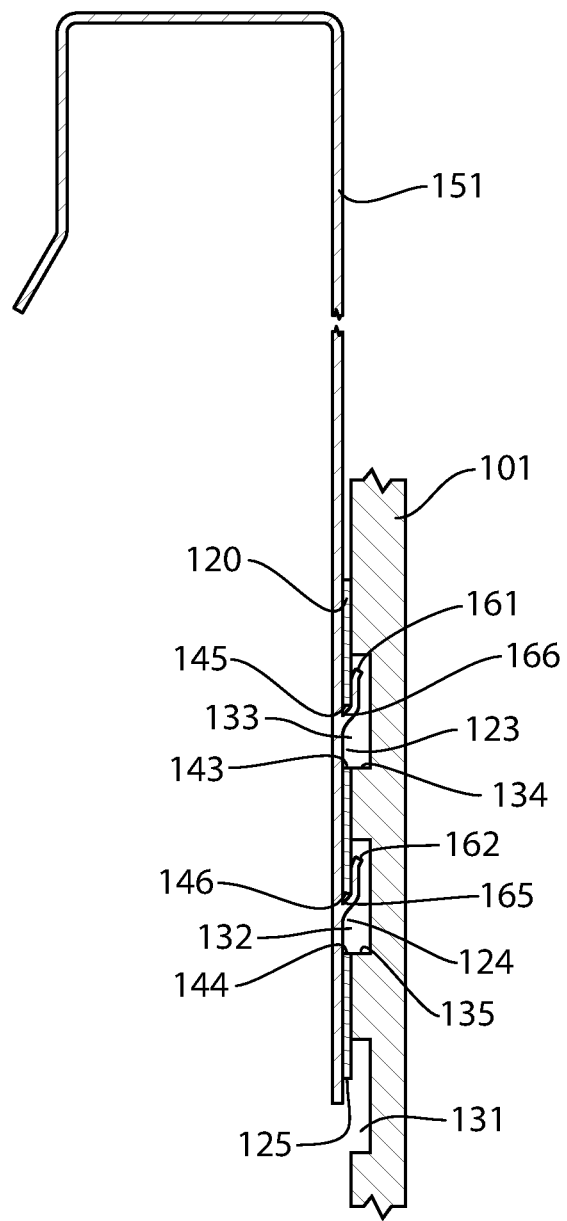
FIG. 6 is a cross-sectional schematic of the over-the-door hanging apparatus of FIG. 1 illustrating the connection between the elongate member and the mounting plate.

Referring to FIGS. 5 and 6 concurrently, the placement and attachment of the first mounting plate 120 to the rear surface 103 of the frame 101 will be described. In FIGS. 5 and 6, only the first mounting plate 120 is shown for clarity and ease of understanding. However, it is to be understood that the second mounting plate 220 is attached to the rear surface 103 of the frame 101 in the same manner as the first mounting plate 120, except that the second mounting plate 220 is attached to the opposite side of the vertical centerline A-A of the frame 101 (FIG. 2) in cooperation with a second channel.

The first mounting plate 120 is secured to the rear surface 103 of the frame 101 so that the vertical axis B-B of the first mounting plate 120 is coextensive with the elongated channel 130, which in the exemplified embodiment is substantially parallel with the vertical centerline A-A. The second mounting plate 220 is secured to the rear surface 103 of the frame 101 on the opposite side of a vertical centerline A-A of the frame 101 in an identical orientation with respect to the second channel 230.

More specifically, the first mounting plate 120 is secured to the frame 101 so that: (1) the first channel segment 131 extends from a position below the bottom edge 125 of the first mounting plate 120 to a position above the bottom edge 125 of the first mounting plate 120; (2) the second channel segment 132 extends from a position below the top edge 146 of the bottom aperture 124 of the first mounting plate 120 to a position above the top edge 146 of the bottom aperture 124 of the first mounting plate 120; and (3) the third channel segment 133 extends from a position below the top edge 145 of the top aperture 123 of the first mounting plate 120 to a position above the top edge 145 of the top aperture 124 of the first mounting plate 120. While not required, it may be preferred that the first mounting plate 120 be secured to the frame 101 so that further: (1) the bottom edge 144 of the bottom aperture 124 is aligned with the top edge 146 of the bottom aperture 124 of the first mounting plate 120; and (2) the bottom edge 143 of the top aperture 123 of the first mounting plate 120 is aligned with the top edge 145 of the top aperture 123 of the first mounting plate 120.

When the first mounting plate 120 is secured to the frame 101 in the manner described above, the top aperture 123 is aligned with the first channel segment 133 and forms a passageway through the first mounting plate 120 into the third channel segment 133. Similarly, the bottom aperture 124 is aligned with the second channel segment 132 and forms a passageway through the first mounting plate 120 into the second channel segment 132. Moreover, the top edge 145 of the top aperture 123 extends transversely across the third channel segment 133. The top edge 146 of the bottom aperture 124 extends transversely across the second channel segment 132. The bottom edge 125 of the first mounting plate 120 extends transversely across the first channel segment 131.

Referring solely now to FIG. 6, the first, second and third channel segments 131-133 preferably extend above the bottom edge 125 of the first mounting plate 120, the top edge 146 of the bottom aperture 124, and the top edge 145 of the top aperture 123, respectively, by a distance that is at least equal to the length of the hooks 161, 162. This configuration provides sufficient space for the hooks 161, 162 to fit within the selected channel segments 131-133 when the frame 101 is slidably mounted to the bracket assembly 150 as will be discussed below.

Referring to FIGS. 2, 5 and 6 concurrently, the attachment of the bracket assembly 150 to the first and second mounting plates 120, 220 will be described. The description will be provided with specific reference to the mating between the first mounting plate 120 and the first elongate member 151 of the bracket assembly 150. However, it should be understood that the description is equally applicable to the mating of the second mounting plate 220 with the second elongate member 251.

After properly aligning the first mounting plate 120 as described above, the first mounting plate 120 is secured to the rear surface 103 of the frame 101 by extending the screws 121 through the screw holes 122 and threadily engaging the frame. It is preferred that the first and second mounting plates 120, 220 be preassembled (i.e., secured) to the frame 101 during manufacturing. Thus, the user will be able to hang the apparatus 100 to a door without the need for any tools or excessive physical strength. In other words, the user will purchase the product fully assembled with the exception that the bracket assembly 150 will be separate from the first and second mounting plates 120, 220 and frame 101. As such, the user will only need to slide the U-Shaped brackets of the bracket assembly 150 over the top edge of the door and then slide the hooks 161, 162 of the bracket assembly into mating cooperation with either: (1) the top edges 145, 146 of the apertures 123, 124; or (2) the top edge 146 and the bottom edge 125.

By nature of having an option between sliding the hooks 161, 162 of the bracket assembly into mating cooperation with either: (1) the top edges 145, 146 of the apertures 123, 124; or (2) the top edge 146 and the bottom edge 125, the inventive over-the-door hanging apparatus 100 has an advantageous built-in hanging height adjustability. In other words, depending upon which of the channel segments 131-133 of the frame 101 the top and bottom hooks 161, 162 are attached to, the hanging height may be altered. A more detailed description of how the inventive over-the-door hanging apparatus 100 may be hung at a lower and/or a higher position will be set forth below. It should be understood, however, that while the description will be set forth below in relation to the first elongate member 151 mating with the first mounting plate 120 and the first channel 130, the same principles apply to the mating between the second elongate member 151, the second mounting plate 220, and the second channel 230.

When a lower hanging position is desired, such as is shown in FIG. 6, the first elongate member 151 of the bracket assembly 150 will be attached to the frame 101 by inserting the bottom hook 162 through the bottom aperture 124 in the first mounting plate 120 and the top hook 161 through the top aperture 123 in the first mounting plate 120. Because the first mounting plate 120 is attached to the frame 101 so that the bottom aperture 124 is aligned with the second channel segment 132 and the top aperture 123 is aligned with the third channel segment 133, the bottom hook 162 will be inserted into the second channel segment 132 of the frame 101 while the top hook 161 will be inserted into the third channel segment 133 of the frame 101. Once sufficiently inserted through the apertures 123, 124 and into the second and third channel segments 132, 133 of the frame 101, the frame 101 will be lowered (or the elongate member 151 will be raised) until the top edge 145 of the top aperture 123 of the first mounting plate 120 slides into the slot 168 of the top hook 161 and the top edge 146 of the bottom aperture 124 of the first mounting plate 120 slides into the slot 169 of the bottom hook 162. When fully slid into the slots 168, 169, the base 165 of the bottom hook 162 will contact the top edge 146 of the bottom aperture 124 of the first mounting plate 120 and the base 166 of the top hook 161 will contact the top edge 145 of the top aperture 123 of the first mounting plate 120.

As noted above, the second and third channel segments 132, 133 extend upwardly beyond the edges 145, 146 (in the direction of the vertical axis A-A) and beneath the first mounting plate 120. This configuration enables the hooks 161, 162 of the bracket assembly 150 to extend into the frame 101 so that a portion of the first mounting plate 120 is snugly disposed within each of the slots 168, 169.

Through this slidable mating, the hooks 161, 162 frictionally engage the portions of the first mounting plate 120 positioned within the slots 168, 169 to prevent the frame 101 from becoming accidentally dislodged from the bracket assembly 150. The frictional engagement is further facilitated by the S-shape and resilient nature of the hooks 161, 162. Although the attachment is described as being a friction fit, the invention is not so limited and the attachment may be described as a press fit, an interference fit or any other fit as would be known to persons skilled in the art. The attachment between the bracket assembly 150 and the frame 101 will be enhanced when the U-shaped bracket 158 of the bracket assembly 150 is attached to a top edge of a door because the weight of the flat article 110 being hung will increase the tight nature of the fit between the hooks 161, 162 and the combined plate/frame 120/101 apparatus.

The invention has been described with the bracket assembly 150 attached to the second and third channel segments 133, 132 in the frame 101. Such an attachment is used when the hanging height of the mirror or article is desired to be a lower hanging height. As noted above, the hanging height of the over-the-door hanging apparatus 100 is adjustable. Therefore, the mirror or other flat article 110 may be hung at a higher hanging height in the manner described below and as shown in FIG. 2.

When the first mounting plate 120 is secured to the frame 101, the first channel segment 131 in the frame 101 extends beyond the bottom edge 125 of the first mounting plate 120 as illustrated in FIG. 2. Therefore, rather than attaching the bracket assembly 150 through the second and third channel segments 133, 132 of the frame 101, the hooks 161, 162 of the bracket assembly 150 are attached to the second and first channel segments 132, 131 of the frame 101, respectively. Specifically, the bottom hook 162 will be inserted into the first channel segment 131 below the bottom edge 125 of the first mounting plate 120 while the top hook 161 will be inserted into the second channel segment 132 via the bottom aperture 124 of the first mounting.

Once sufficiently inserted into the first and second channel segments 131, 132 of the frame 101, the frame 101 will be lowered (or the elongate member 151 will be raised) until the top edge 146 of the bottom aperture 124 of the first mounting plate 120 slides into the slot 168 of the top hook 161 and the bottom edge 146 of the first mounting plate 120 slides into the slot 169 of the bottom hook 162. When fully slid into the slots 168, 169, the base 165 of the bottom hook 162 will contact the top edge 146 of the bottom aperture 124 of the first mounting plate 120 and the base 166 of the top hook 161 will contact the bottom edge 125 of the first mounting plate 120.

As noted above, the first and second channel segments 131, 132 extend upwardly beyond the edges 146, 125 (in the direction of the vertical axis A-A) and beneath the first mounting plate 120. This configuration enables the hooks 161, 162 of the bracket assembly 150 to extend into the frame 101 so that a portion of the first mounting plate 120 is snugly disposed within each of the slots 168, 169. Thus, the same frictional/interference fit is formed. With such an attachment, the apparatus 100 may be hung at a higher level on a door than previously described manner. Thus, the present invention provides an easy and efficient way for a user to adjust the hanging height of a mirror or other object without the need for tools or an excessive amount of physical force. The adjustable height mounting is achieved by designing the distances D1, D2, D3 to be substantially equal.

Of course, the second elongate member 251 may be attached in the same manner as described above except that the second elongate member 251 is attached to the second mounting plate 220 which is secured onto the frame 101 on the opposite side of the vertical centerline A-A. By using the first and second elongate members 151, 251, the flat article 110 will be more securely hung from the top of the door.

Referring to FIGS. 7 and 8 concurrently, an alternative embodiment of a frame 301 to be used with an over-the-door hanging apparatus 300 will be described. The components of the over-the-door hanging apparatus 300 that are the same as the components described above with reference to the over-the-door hanging apparatus 100 will be delineated by the same reference numerals except that the over-the-door hanging apparatus 300 will use the 300- and 400-series of numbers rather than the 100- and 200-series of numbers. Furthermore, only those aspects of the over-the-door hanging apparatus 300 that are different from the over-the-door hanging apparatus 100 described above will be described below in detail. Therefore, all features of the over-the-door hanging apparatus 300 that are not described below should be interpreted as being identical to the corresponding component from the over-the-door hanging apparatus 100 described above.

Specifically, rather than having a channel 130 comprising three distinct channel segments 131-133 in the frame 101 that require time and effort in order to properly align the first and second mounting plates 120, 220 as described above, the frame 301 may have a continuous channel 330 along all four sides of the frame 301 so as to form an annular channel about the perimeter of the frame 301. This embodiment is advantageous in that it reduces the costs in manufacturing by reducing the amount of material needed to create the frame 301 and by reducing the time required to attach the first and second mounting plates 320, 420 to the frame 301.

In use, the first mounting plate 320 is aligned with the channel 330 so that the channel 330 can be seen through the apertures 323, 324 in the first mounting plate 320. This embodiment nullifies the need to align the apertures 323, 324 of the first mounting plate 320 with the channel 330 in a vertical direction and instead enables the first mounting plate 320 to be attached to the frame 301 in a myriad of positions so long as the channel 330 is visible and accessible through the apertures 323, 324. Such an embodiment provides a significantly greater amount of flexibility to the hanging height of the flat article.

After the first mounting plate 320 (and preferably also the second mounting plate 420) is secured to the frame, the hooks 361, 362 of the bracket assembly 350 are inserted through the apertures 323, 324 of the first mounting plate 320 in the same manner as described above. The entire attachment procedure between the bracket assembly 350 and the frame 301 is identical to the attachment procedure described above with reference to the bracket assembly 150 and the frame 101. Essentially, the over-the-door hanging apparatus 300 is identical to the over-the-door hanging apparatus 100 except that instead of having a segmented channel 130 in the frame 101, there is one continuous channel 330 in the frame 301 that forms a rectangular border around the entirety of the frame 301. As can be seen the channel 330 still extends from a position below to a position above each of the edges 345, 346, 325.

Referring to FIG. 9, another alternative embodiment of the channel in the frame will be described. This embodiment comprises a continuous channel 530 that is not segmented and that does not form a border around the frame 101. Rather, the channel 530 only extends from a position below the bottom edge 147 of the first mounting plate 120 to a position above the top edge 145 of the top aperture 123 of the first mounting plate 120. In such an embodiment, a second channel (not shown) which is identical to the channel 530 will be located on the opposite lateral side of the frame 101, thereby forming a mirror image.

Figure 10:
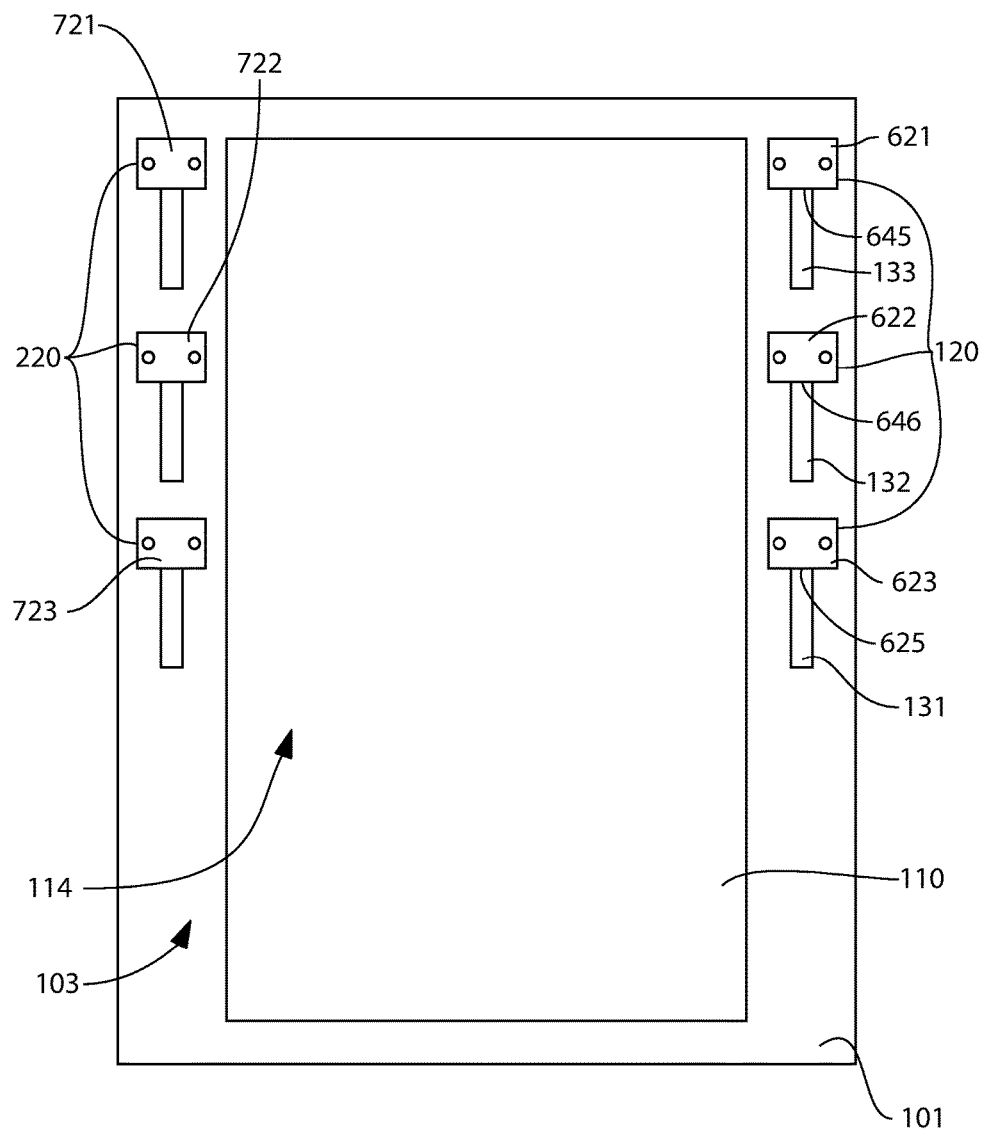
FIG. 10 is a rear view of an over-the-door hanging apparatus in accordance with a third embodiment of the present invention.

Referring to FIG. 10, an alternative embodiment for a mounting plate will be described. The first and second mounting plates 120, 220 may each comprise a first plate segment 621, 721, a second plate segment 622, 722 and a third plate segment 623, 723. This embodiment will be further described only with reference to the first mounting plate 120. It should be understood that the second mounting plate 220 will have features and components that are identical to the first mounting plate 120.

In the embodiment illustrated in FIG. 10, a bottom edge 625 of the third plate segment 623 serves an identical purpose to the bottom edge 125 of the first mounting plate 120 described above. Furthermore, a bottom edge 646 of the second plate segment 622 serves an identical purpose to the top edge 146 of the bottom aperture 124 of the first mounting plate 120. Further still, a bottom edge 645 of the first plate segment 621 serves an identical purpose to the top edge 145 of the top aperture 123 of the first mounting plate 120. It should be understood to a person skilled in the art that the inventive over-the-door hanging apparatus 100 would operate in the same exact manner with the three plate segment 621, 622, 623 embodiment as it would with the mounting plate 120 as described above. In other words, the bracket assembly 150 will be attached to the embodiment illustrated in FIG. 10 in the same manner as was described above.

Figure 11:
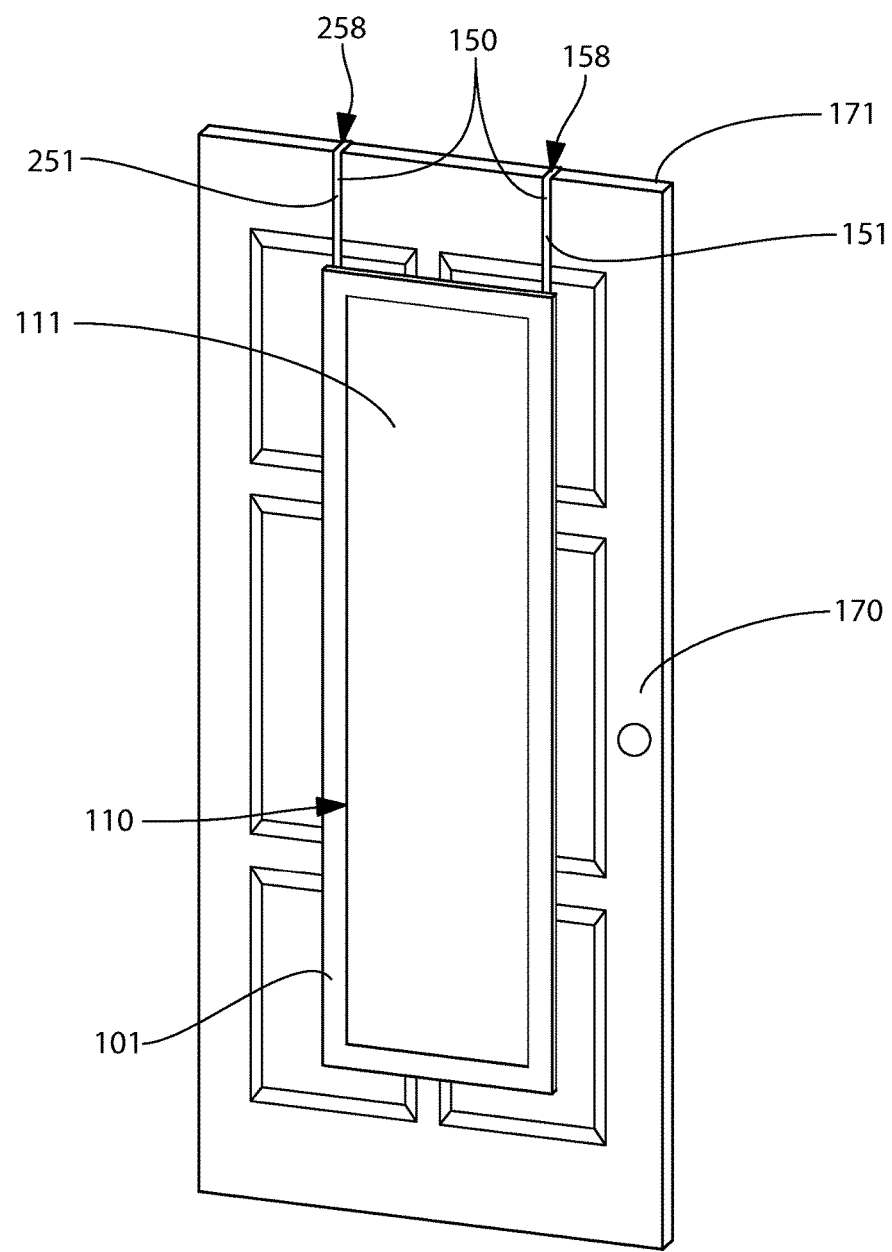
FIG. 11 is a perspective view of the over-the-door hanging apparatus of FIG. 1 hanging from a top edge of a door.

Referring to FIG. 11, the mirror 110 or other article is illustrated hanging from a top edge 171 of a door 170. In the illustrated embodiment, the mirror or other flat article 110 is attached to the bracket assembly 150 which comprises the first elongate member 151 and the second elongate member 251 on opposite lateral sides of the rear surface (not shown) of the flat article 110. The U-shaped brackets 158, 258 of the elongate members 151, 251 of the bracket assembly 150 are attached to the top edge 171 of the door 170 so that the flat article 110 is hung therefrom. When the flat article 110 is a mirror, it is hung so that the reflective front surface 111 is visible and the rear surface (not shown) is in surface contact with the door 170. It should be understood that any of the various types of channels and mounting plates may be used with the inventive over-the-door hanging apparatus in many different combinations. For example, the three plate segment 621, 622, 623 mounting plate may be used with the segmented channels 131, 132, 133 or with the elongated channel 530 or with the border/annular channel 330. Similarly, the first and second mounting plates 120, 220 may also be used with any of the above mentioned channel configurations.

In alternative embodiments of the invention, which are not illustrated, the frame 100 may not include channels 130, 230 in its rear surface 101. In such embodiments, the first and second mounting plates 120, 220 (or the segments thereof) would be placed over planar sections of the rear surface 101 of the frame 100 and be designed so that the hooks 161-162, 191-292 could be slid/inserted between a raised portion of the mounting plates 120, 220 and the planar sections of the rear surface 101. This could be accomplished by forming the first, second and/or third edges 125, 145, 146 to include a raised portion that protrudes from the rear surface 101 of the frame 100, thereby forming a nesting space/gap between the rear surface 101 of the frame 100 and the rear surfaces of the mounting plates 120, 220 (or the segments thereof). For example, the mounting plates 120, 220 (or the segments thereof) could be formed in to resemble one half of a C-clamp and/or a V-clamp. In another example, a small section of the first, second and/or third edges 125, 145, 146 could be bent out of plane with the remaining sections of the mounting plates 120, 220 (or the segments thereof) that are coupled to the frame 100. Finally, any of the foregoing details described above with respect to FIGS. 1-11 could be utilized with such an alternative embodiment.

In a still further embodiment of the invention, shown in FIGS. 12-17B, the frame 801 may be designed so that the channels 130, 230 are omitted. In such an embodiment, the bracket assembly 850 comprises a first elongate member 851 and a second elongate member 951 that are slidably attached to mounting plates 820, 920 respectively. In this embodiment, the first and second mounting plates 820, 920 are placed over planar sections of the rear surface 803 of the frame 801. To avoid redundancy, only the first mounting plate 820, along with its cooperation with the first elongate member 851, is described in detail herein with the understanding that the second mounting plate 920, and its coupling to the second elongate member 951, is identical.

Figure 15A:
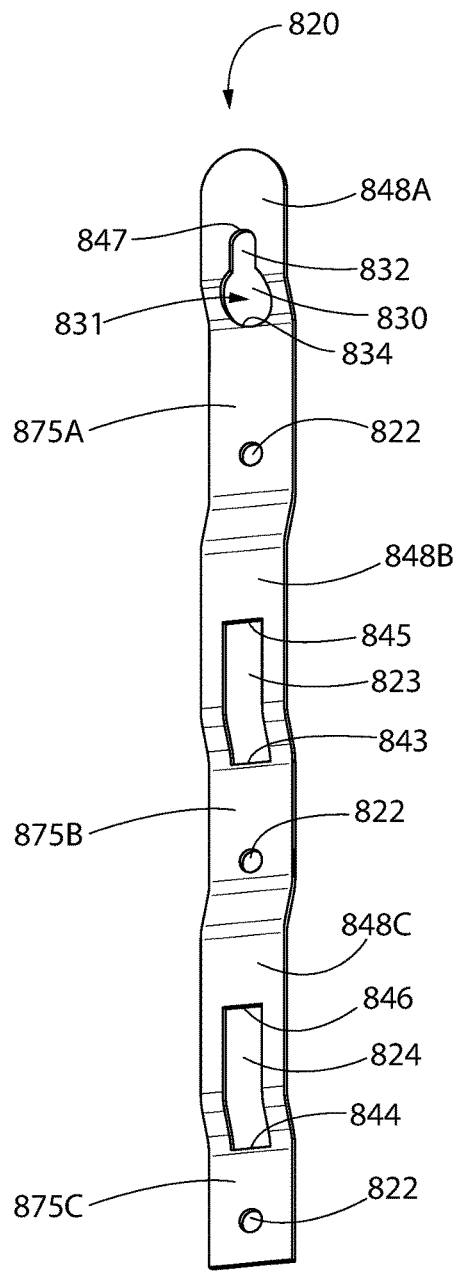
FIG. 15a is a perspective view of a mounting plate of the over-the-door hanging apparatus of FIG. 12.
Figure 15B:
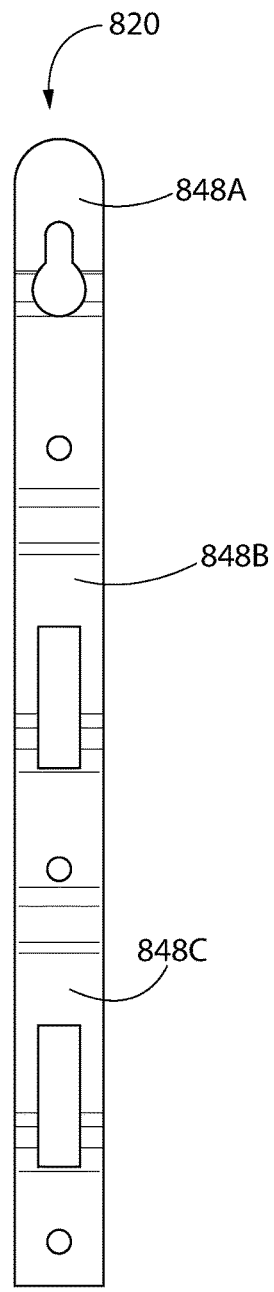
Figure 16:
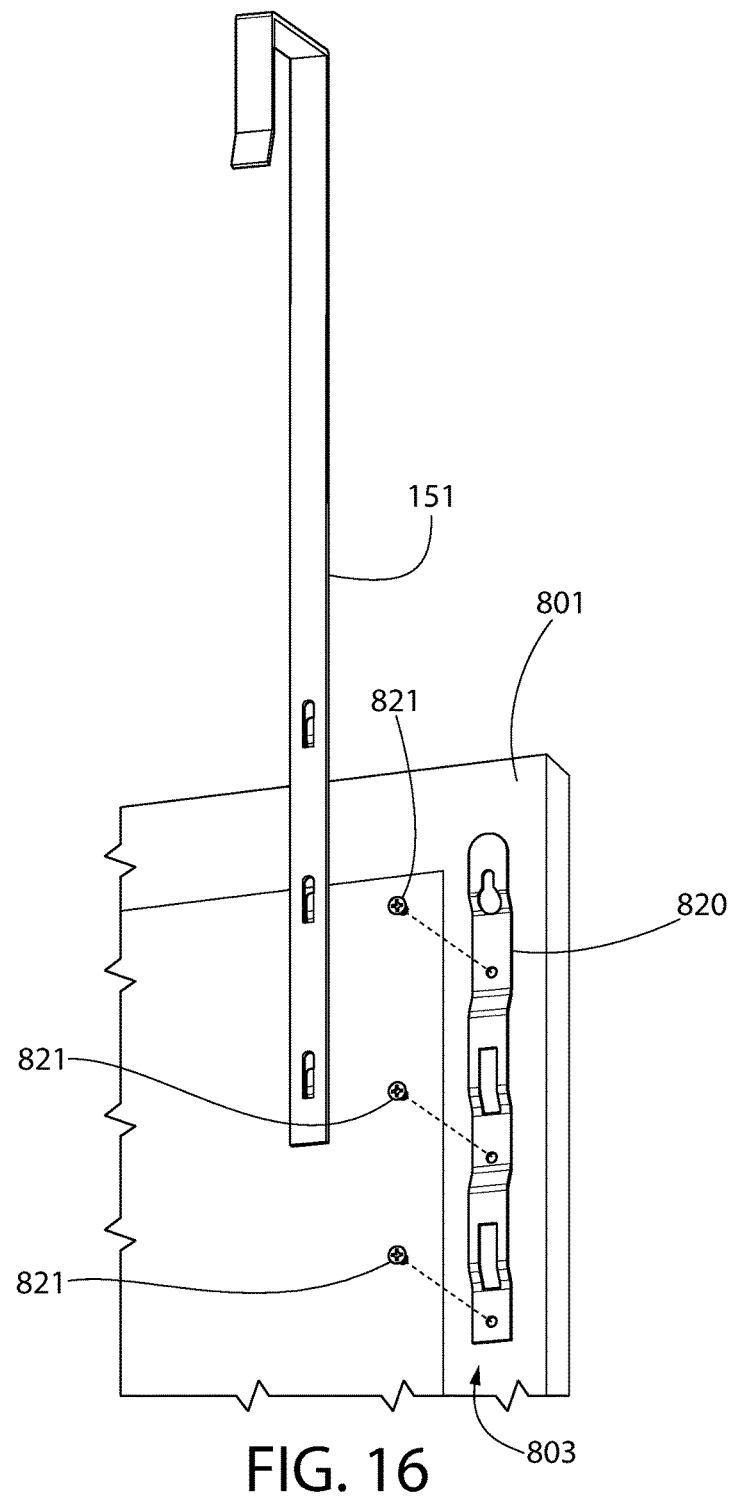
FIG. 16 is an exploded view of a portion of the over-the-door hanging apparatus of FIG. 12.

As best shown in FIGS. 15A and 15B, the first mounting plate 820 generally comprises a plurality of planar portions 875A-C and a plurality of raised portions 848A-C. The plurality of planar portions 875A-C are substantially coplanar with one another. Similarly, the plurality of raised portions 848A-C are substantially coplanar with one another. The plurality of raised portions 848A-C are offset from and not coplanar with the plurality of planar portions 875A-C. The plurality of raised portions 848A-C and the plurality of planar portions 875A-C are arranged in an alternating manner and are interconnect to one another.

The first mounting plate 820 is designed so that the hooks 861-863 (or flanged bosses, rivets, screws or bolts in other embodiments) of the first elongate member 851 may be slidably inserted between the raised portions 848A-C of the first mounting plate 820 and the planar sections of the rear surface 801 of the frame 801, respectively.

The first mounting plate 820 further comprises a first aperture 823, a second aperture 824, and a multi-width aperture 830 that are formed in the raised portions 848A-C of the first mounting plate 820 respectively. The multi-width aperture 830 is divided into a nesting section 832 and a receiving section 831. The nesting section 832 extends vertically from the receiving section 831 and is narrowed relative to the receiving section 831. Stated simply, the nesting section 832 has a width that is less than the width of the receiving section 831. While the multi-width aperture is exemplified as having stepped width, in other embodiments the width may simply taper such that the multi-width slot resembles a V-shape.

The multi-width aperture 830 terminates in a top edge 847. As exemplified, the top edge 847 is curved to accommodate the shaft of a screw but can be linear in other embodiments. The receiving section 831 is sized such that it will permit the head of a screw, flanged fastener, bolt, or rivet to pass therethrough. The receiving section 831 of the multi-width aperture 830 may have a semi-circular shape or may be constructed in any shape that permits the passage of a flanged portion of fastener (such as the head of a screw or the head of a flanged fastener).

The multi-width aperture 830 has a bottom edge 834 that is located on or near the planar portion 875A of the first mounting plate 820 to facilitate insertion of the screw head into the screw aperture 830. The nesting section 832 is sized such that the head of the screw may not pass through the slot section 832. This allows the multi-width aperture 830 of the first mounting plate 820 to be aligned with a protruding screw such that the screw head can be slid into the receiving section 831. Then, upon the first mounting plate 820 being slid downward, the screw body passes into the nesting section 832 and the screw head is trapped between the raised portion 848A of the first mounting plate 820 and the rear surface of the frame 801, thereby facilitating mounting to a door or other vertical surface.

Each of the first aperture and second aperture 823, 824 have a top edge 845, 846 respectively. The top edge 845 of the first aperture 823 is located on the raised portion 848B while the top edge 846 of the second aperture 824 is located on the raised portion 848C. The first and second apertures 823, 824 also have bottom edges 843, 844, respectively. The bottom edge 843 of the first aperture 823 is located on the planar portion 875B while the bottom edge 844 of the second aperture 824 is located on the planar portion 875C. As will be discussed below with respect to FIG. 17A, the hooks 861-863 are slidably inserted into the apertures 823, 824, 830 and engage the top edges 845-847 of the first mounting plate 820.

The first mounting plate 820 further includes a plurality of fastener holes 822 which are sized and configured to receive a screw (or other fastener) to facilitate fixed attachment of the first mounting plate 820 to the rear surface 803 of the frame 801. Although the first mounting plate 820 is illustrated as having three fastener holes 822, the invention is not so limited and the first mounting plate 820 may have more or less than three fastener holes 822 as desired. When attached to the frame 801, the planar portions 875A-C are in surface contact with the rear surface 803 of the frame 801.

Figure 12:
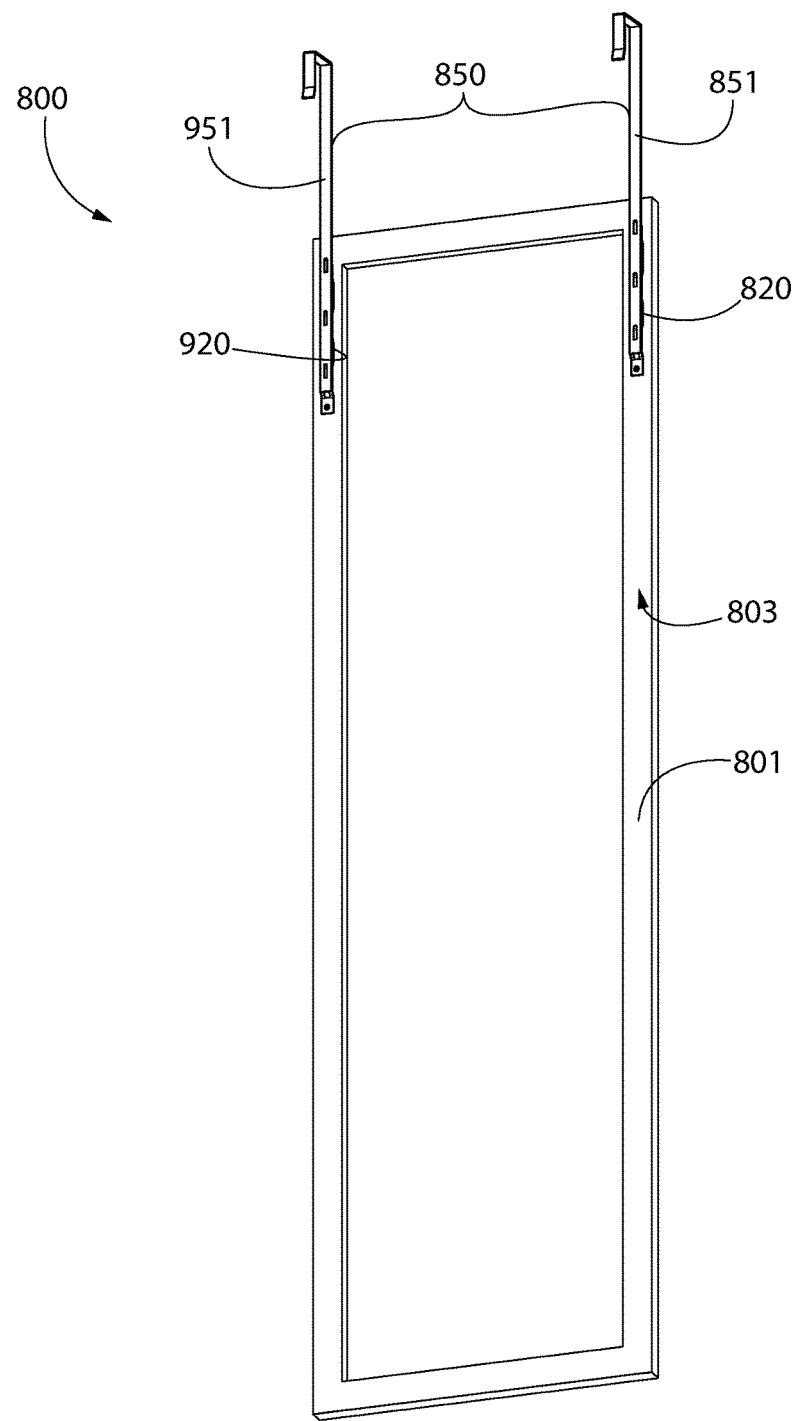
FIG. 12 is a perspective rear view of an over-the-door hanging apparatus in accordance with a fourth embodiment of the present invention.
Figure 13:
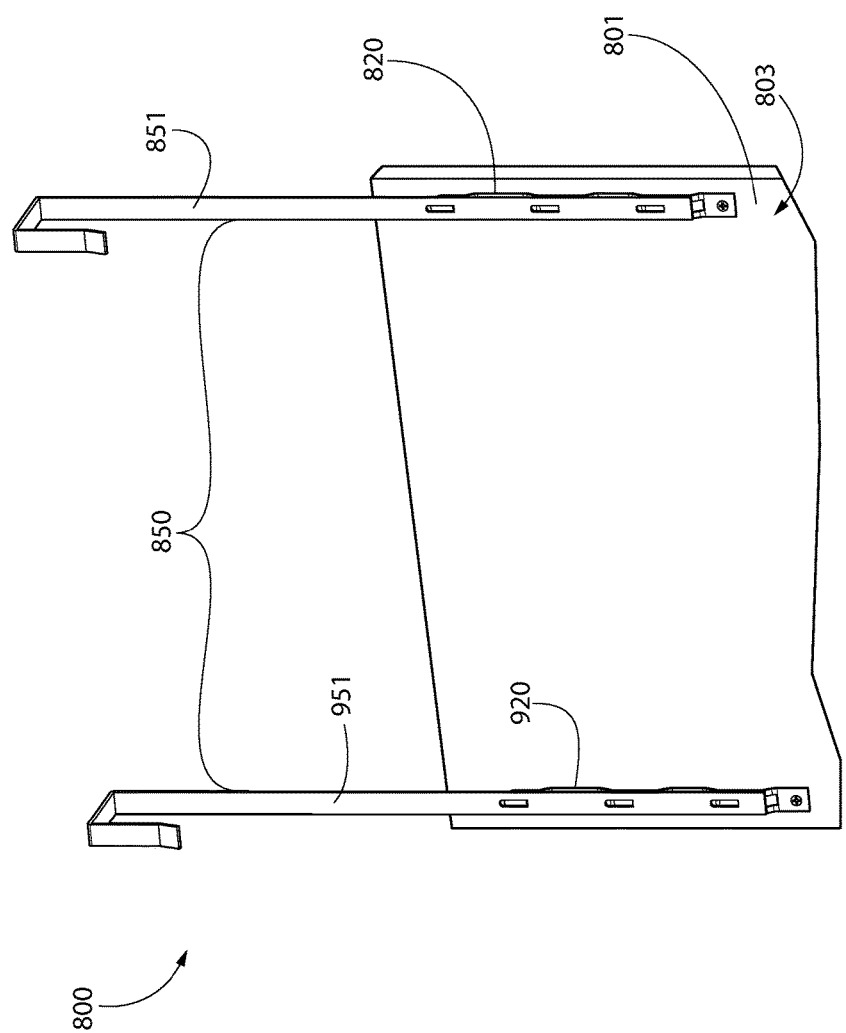
FIG. 13 is a close-up view of a top portion of the over-the-door hanging apparatus of FIG. 12.
Figure 14A:
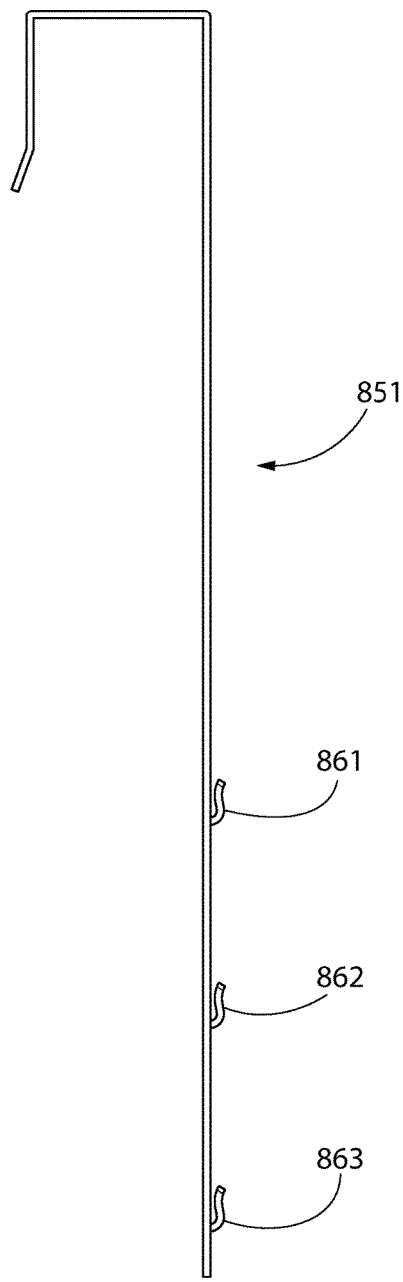
FIG. 14a is a side view of an elongate member of the over-the-door hanging apparatus of FIG. 12.
Figure 14B:
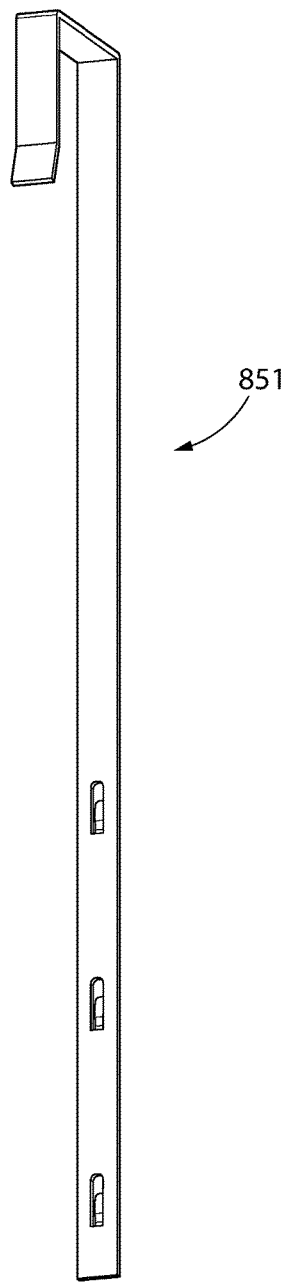
Figure 17A:
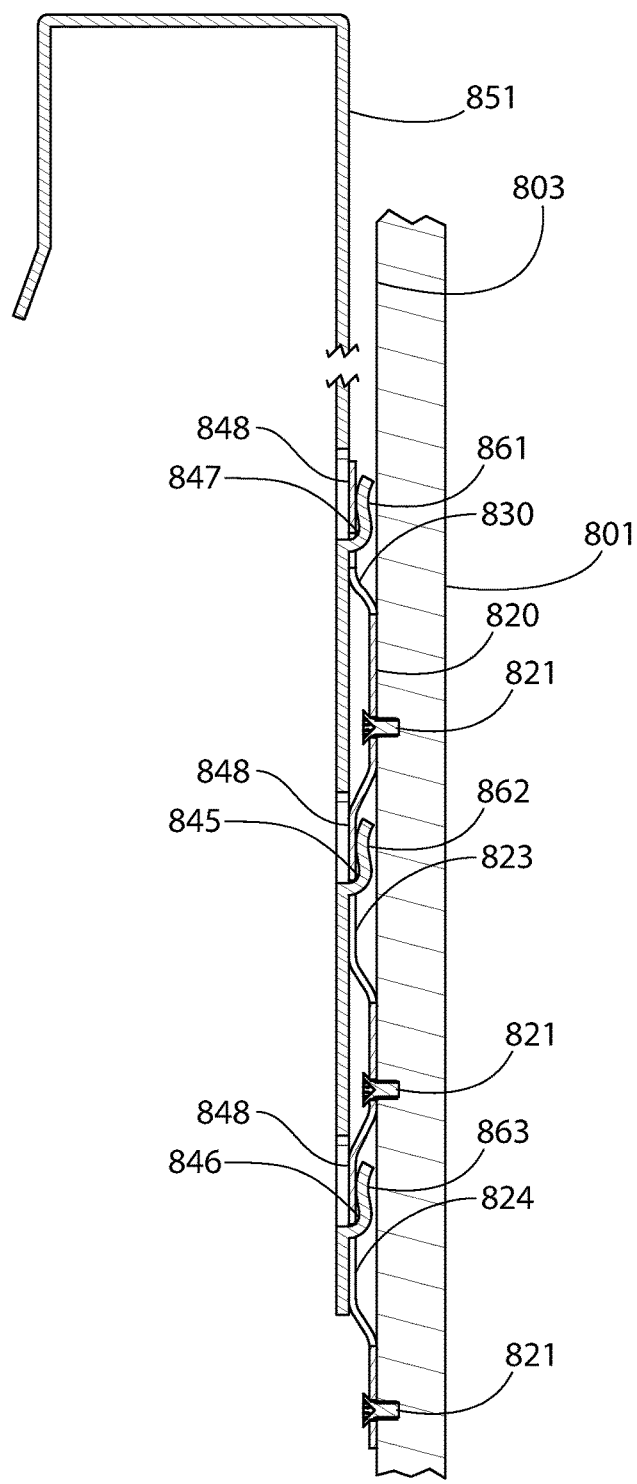
FIG. 17a is a cross-sectional schematic of the over-the-door hanging apparatus of FIG. 12 showing the connection between the elongate member and the mounting plate.

As can be best seen in FIGS. 12 and 17A, the over-the-door apparatus 800 may be hung from a door by using the first and second elongate members 851, 951. The first and second elongate members 851, 951 are slid over the top edge of the door as described above for the embodiments of FIGS. 1-10. The first and second mounting plates 820, 920, which are coupled to the frame 801, are then slidably mounted to the first and second elongate members 851, 951, respectively, as discussed in greater detail below.

To avoid redundancy, only the mounting of the first elongate member 851 to the first mounting plate 820 is described in detail herein with the understanding that the second elongate member 951 and the second mounting plate 920 are identical. In order to slidably mount the first elongate member 851 to the first mounting plate 820, the hooks 861-863 are inserted through the multi-width aperture 830, the first aperture 823, and the second aperture 824. The hook 861 is inserted through the multi-width aperture 830, the hook 862 is inserted through the first aperture 823, and the hook 863 is inserted through the second aperture 824. The elongate member 851 is then slid upward until the hooks 861-863 fully engage the top edges 847, 845, 846 respectively.

Instead of inserting hooks 861-863 through apertures 830, 823, and 824, the hook 861 may be inserted through the first aperture 823 and the hook 862 may be inserted through the second aperture 824. Alternately, hook 862 may be inserted through the multi-width aperture 830 and hook 863 may be inserted through the first aperture 823. In yet other mounting combinations, the hook 861 may be inserted through the second aperture 824. Further, the hook 863 may be inserted through the multi-width aperture 830. By inserting different hooks 861-863 through different apertures 830, 823, 824, adjustments in height may be obtained. In alternate embodiments, there may be more than three hooks 861-863 or apertures 830, 823, 824 or there may be fewer than three hooks 861-863 or apertures 830, 823, 824. The number of hooks 861-863 and the number of apertures 830, 823, 824 need not be equal. In yet other embodiments, the first and second apertures 823, 824 may have the same shape as the multi-width aperture 830.

Figure 17B:
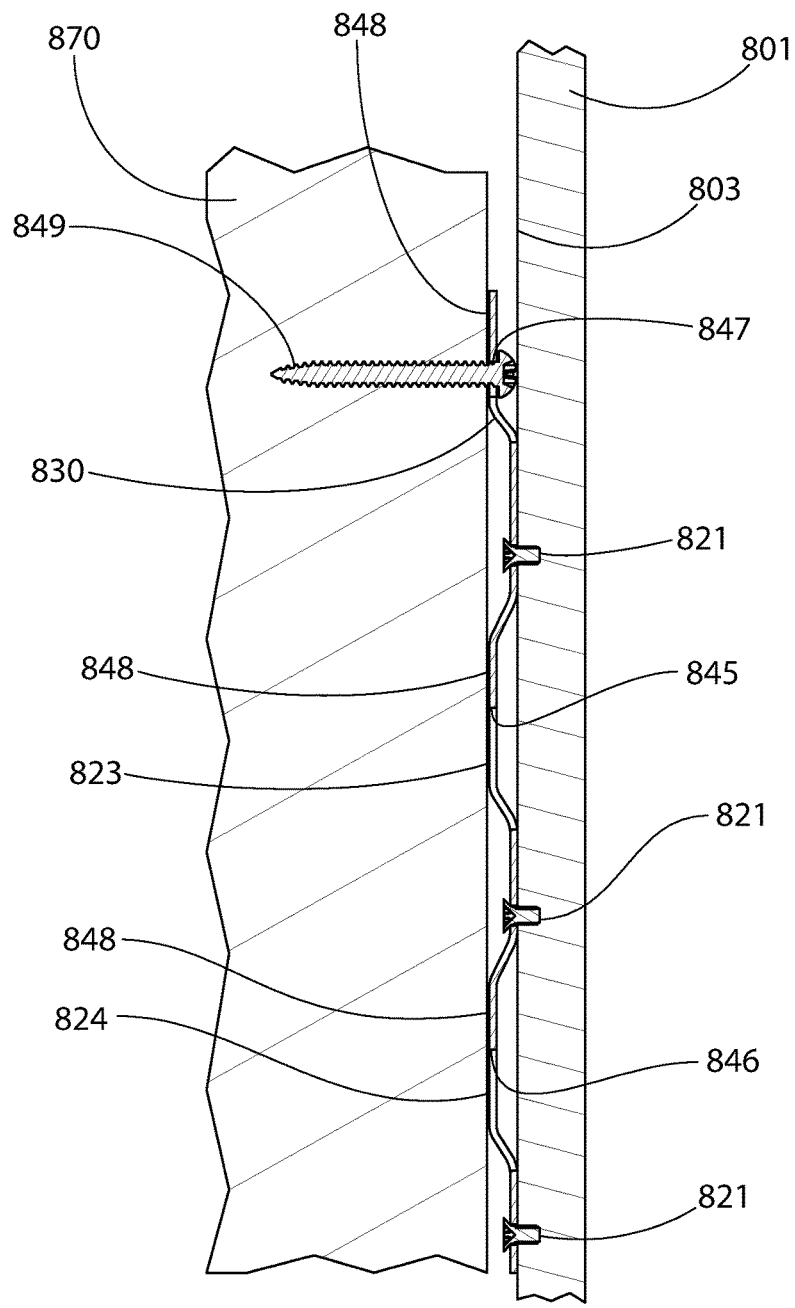
FIG. 17b is a cross-sectional schematic of the over-the-door hanging apparatus of FIG. 12 showing the connection between the mounting plate and a door with the elongate member omitted in accordance with an alternative embodiment.

In an alternate mounting best shown in FIG. 17B, the frame 801 is hung by installing a screw 849 into a door 870. To avoid redundancy, only the first mounting plate 820 is disclosed, with the second mounting plate 920 being identical. Instead of a door 870, the first mounting plate 820 may be mounted to any other vertical surface, such as a wall. As with other embodiments, the first mounting plate 820 is installed to the frame 801 via screws 821, and then the head of the screw 849 is inserted into the multi-width aperture 830 and slid upward until the shaft of the screw 849 contacts the top edge 847 of the multi-width aperture 830. This permits flexible mounting of the frame 801 without requiring the use of the first and second elongate members 851, 951. Multiple screws 849 may be used, and the first mounting plate 820 may be designed to accommodate multiple screw apertures 830 as desired.

Figure 18A:
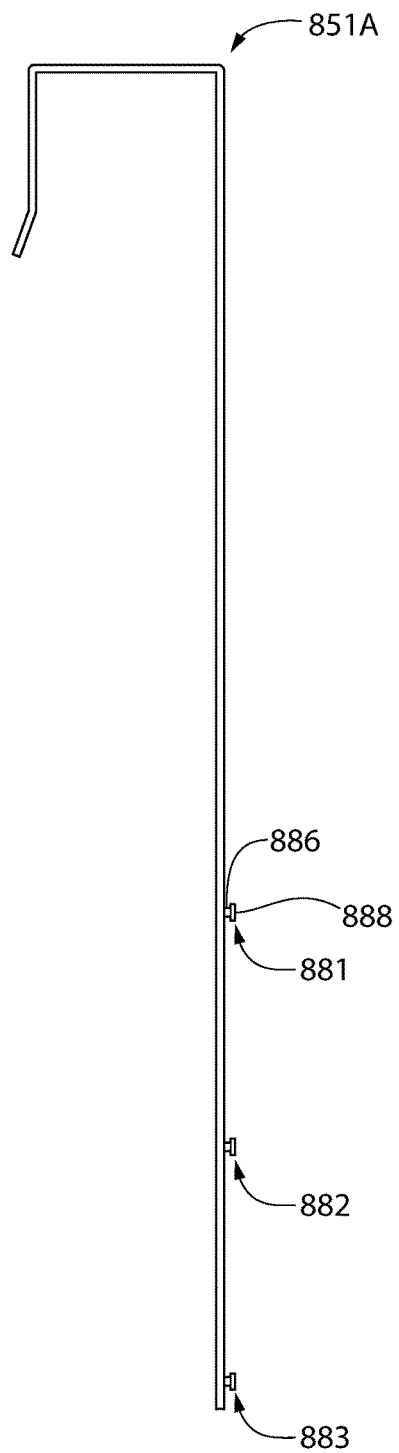
FIG. 18a is a side view of an elongate member of the over-the-door hanging apparatus of FIG. 12 in accordance with an alternative embodiment.
Figure 18B:
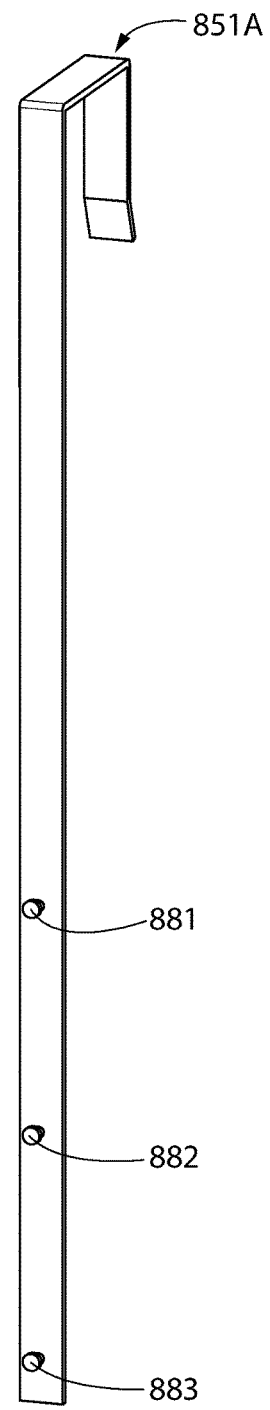

FIGS. 18A and 18B disclose an alternate embodiment of the first elongate member 851A, with three flanged fasteners 881-883 in place of hooks 861-863. The elongate member 851A is identical to the embodiments disclosed in FIGS. 12-17B excepting those features explicitly described. The second elongate member is also identical to the first elongate member 851A disclosed in this embodiment. The flanged fasteners 881-883 each have a post portion 886 and a flange portion 888. The flanged fasteners engage multi-width apertures 891-893 as will be discussed in further detail below.

Figure 19A:
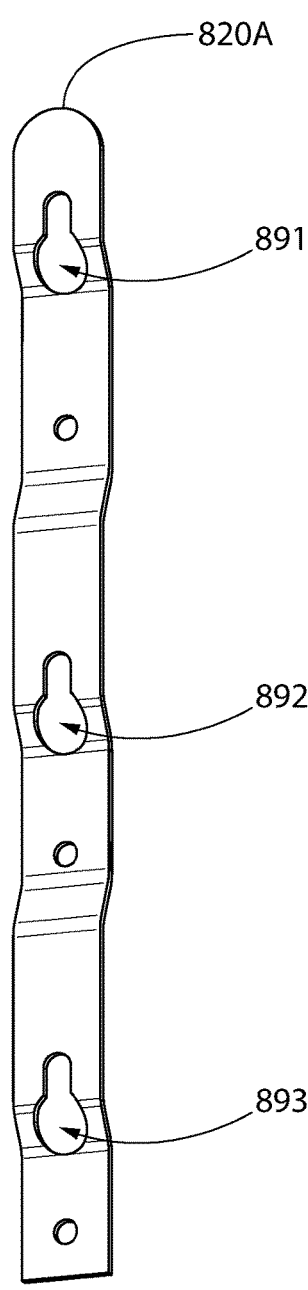
FIG. 19a is a perspective view of a mounting plate of the over-the-door hanging apparatus of FIG. 12 in accordance with an alternative embodiment.
Figure 19B:
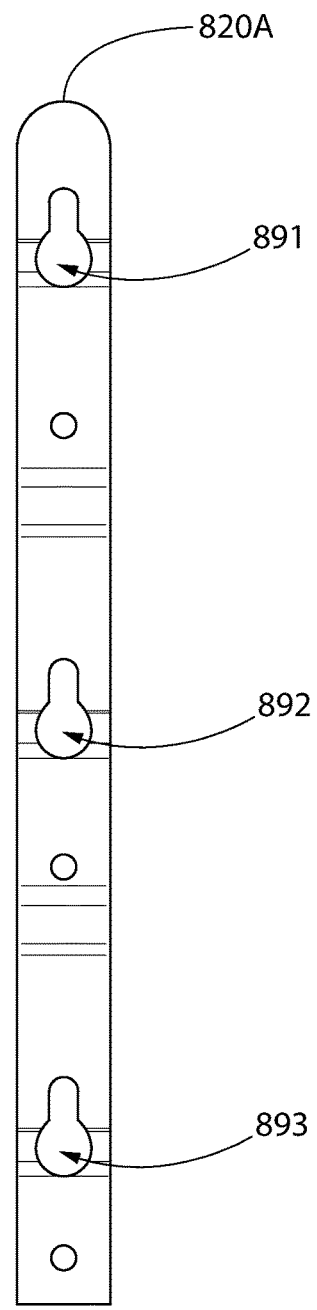

FIGS. 19A and 19B disclose an alternate embodiment of the first mounting plate 820A. The first mounting plate 820A has three multi-width apertures 891-893. The first mounting plate 820A is identical to the embodiment disclosed in FIGS. 12-17B excepting those features explicitly described. The second mounting plate is also identical to the first mounting plate 820A disclosed in this embodiment.

Figure 20:
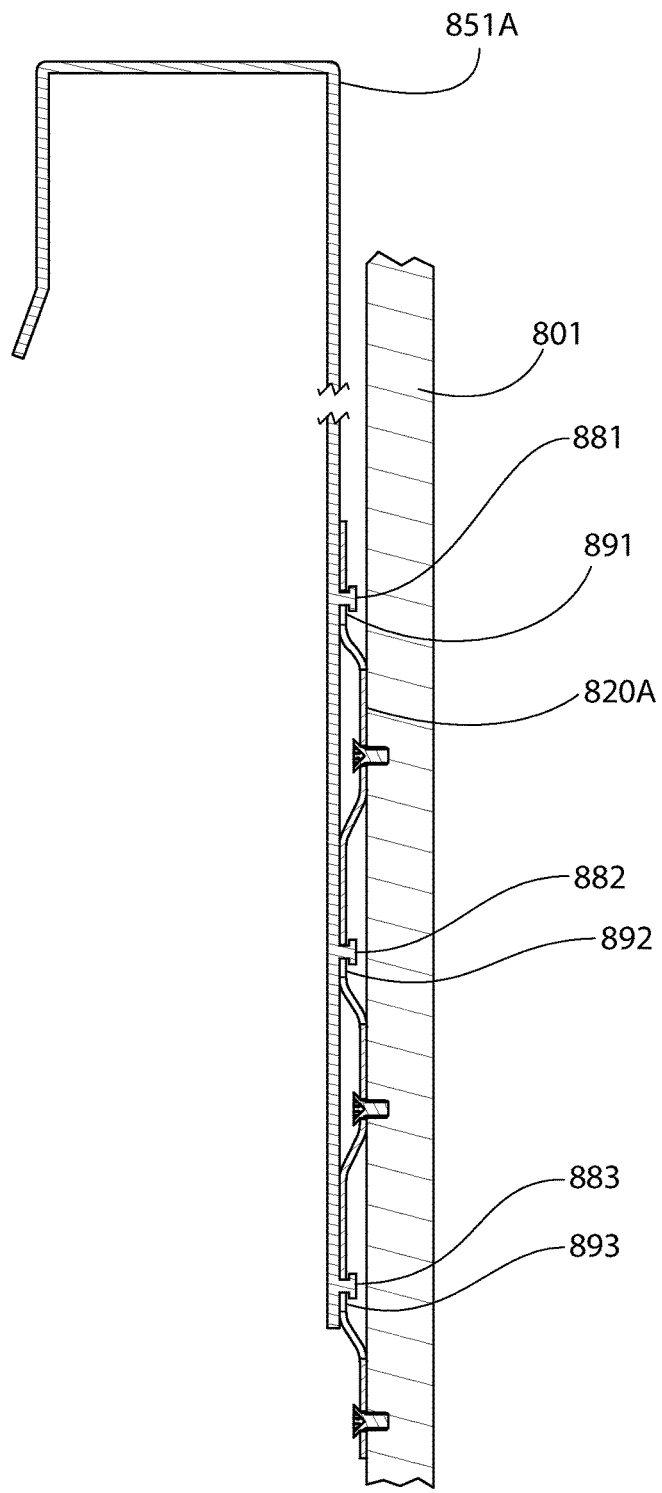

Turning to FIG. 20, the flanged fasteners 881-883 are shown engaged with the multi-width apertures 891-893. The flanged fasteners 881-883 are inserted into the multi-width apertures 891-893 and slidably engaged such that the post portion 886 of the flanged fasteners 881-883 mates with the nesting section of the corresponding multi-width apertures 891-893. The flange portion 888 of the flanged fasteners 881-883 prevents the flanged fasteners 881-883 from withdrawing from the multi-width apertures 891-893 unless the first mounting plate 820A is slid upward with respect to the first elongate member 851A to release the flanged fasteners 881-883. Alternate embodiments of the flanged fasteners 881-883 may be bolts, rivets, screws, or other fasteners having a flange and post portion which permit engagement with the nesting portion of the multi-width apertures 891-893.

In yet other embodiments, the hooks, flanged fasteners, bolts, rivets, or screws of the first and second elongate members as shown and described in the preceding embodiments may be substituted for the apertures of the first and second mounting plates of the preceding embodiments. Likewise, the apertures of the first and second mounting plates may be substituted for the hooks, flanged fasteners, etc. of the first and second elongate members. Thus, the mounting features may be reversed to permit the mounting plates to have hooks or flanged fasteners which engage apertures of the elongate members.

Figure 21A:
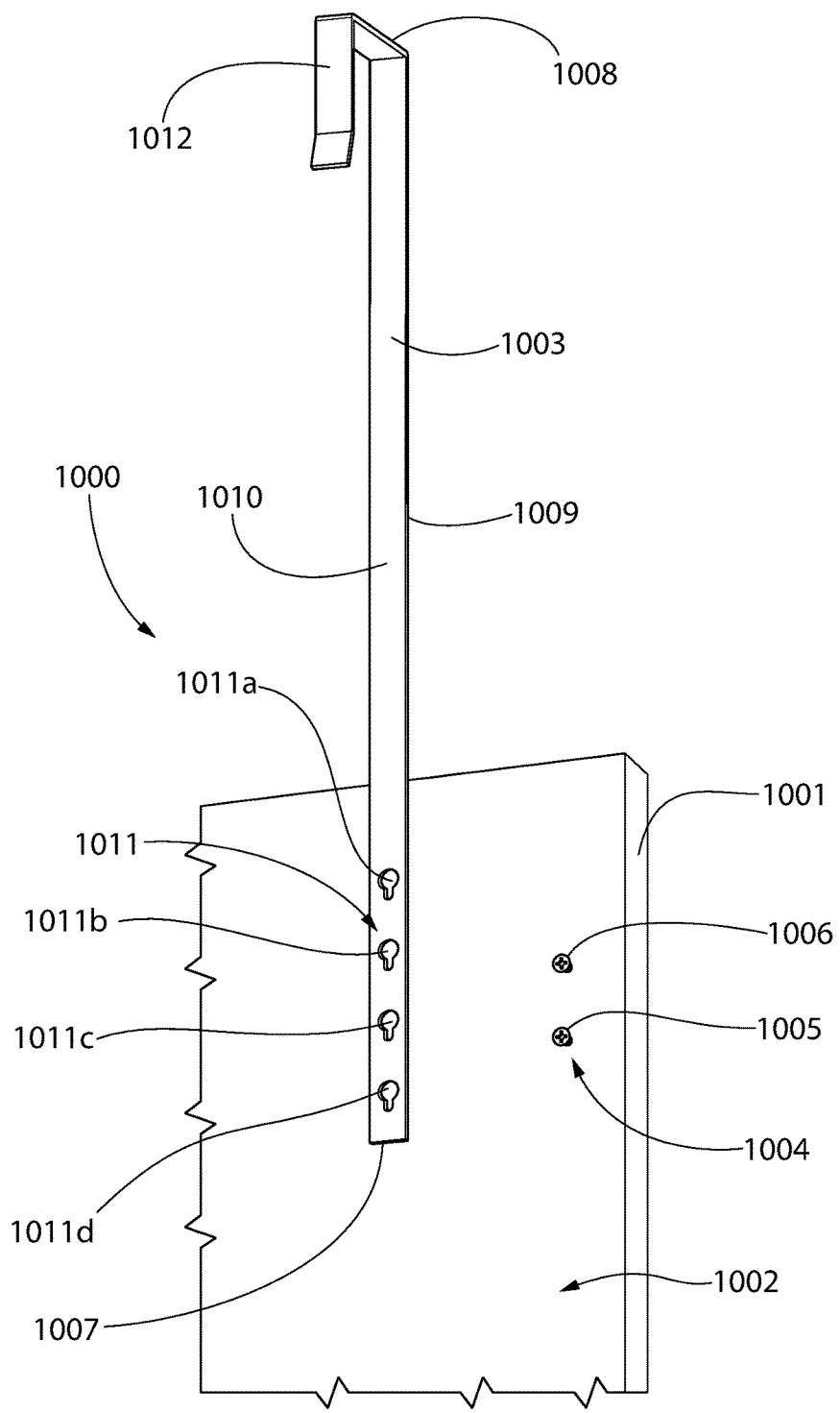
FIG. 21A is a perspective view of a portion of an over-the-door hanging apparatus in accordance with a fifth embodiment of the present invention with an elongate member and a mounting element in a detached state.
Figure 21B:
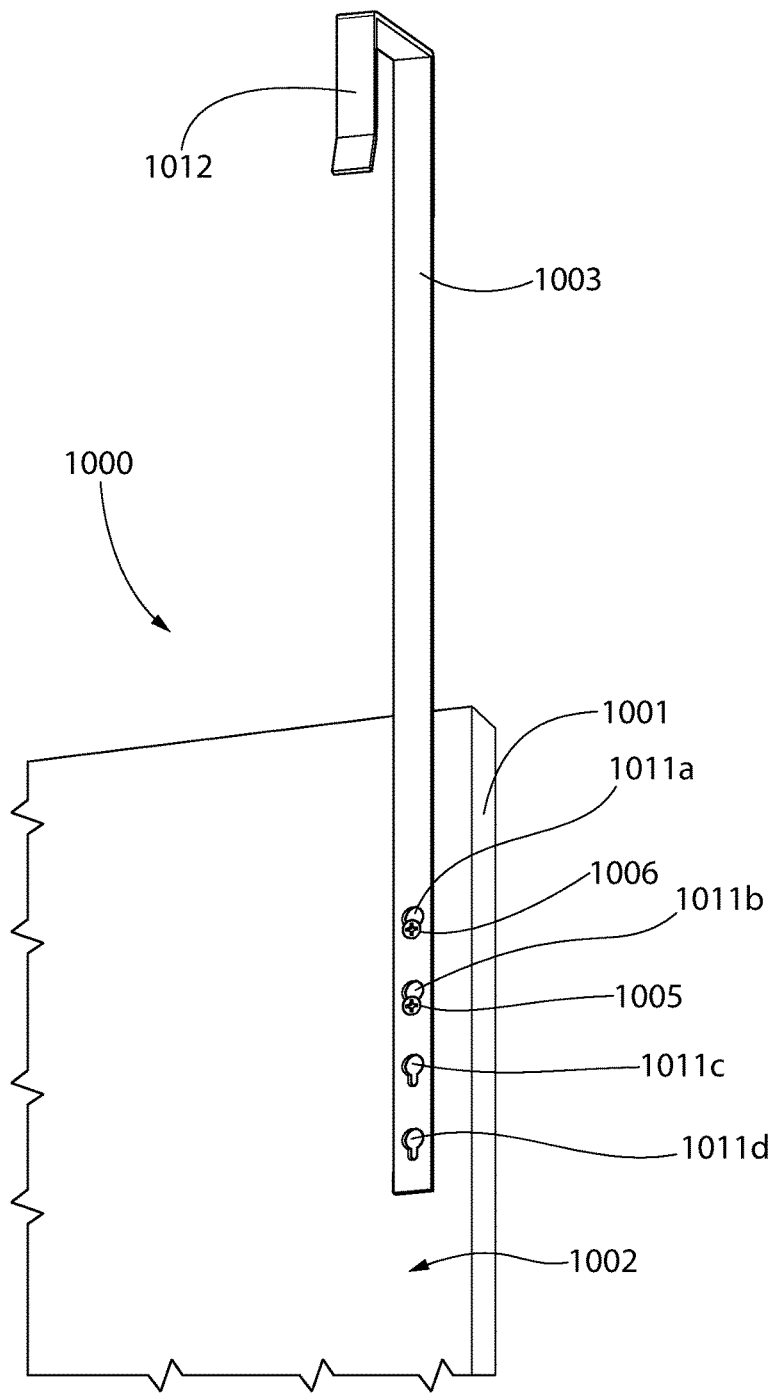
FIG. 21B is a perspective view of the portion of the over-the-door hanging apparatus of FIG. 21A with the elongate member and the mounting element in an attached state.

Referring now to FIGS. 21A and 21B, an over-the-door hanging apparatus 1000 will be described in accordance with yet another embodiment of the present invention. FIGS. 21A and 21B only illustrate a portion of the over-the-door hanging apparatus 1000 showing the coupling components on one side thereof, it being understood that the opposite side thereof may have identical components and an identical structure. Thus, the configuration shown, for example, in FIGS. 1 and 2 is applicable to this embodiment except that the structure of the mounting components is different in this embodiment as will be described herein below.

The over-the-door hanging apparatus 1000 comprises a support structure 1001 having a rear surface 1002. In certain embodiments a mirror is coupled to the support structure

1001. However, the invention is not to be limited to a mirror being coupled to the support structure 1001 in all embodiments and other articles may be coupled to the support structure 1001 in other embodiments as described herein above. The mirror (or other article) is not illustrated in FIGS. 21A and 21B, but the description above regarding the coupling of the mirror may be applicable. In certain embodiments, the support structure 1001 may have the rear surface 1002 and an opposite front surface, and the mirror may be coupled to the front surface. The mirror may be directly or indirectly coupled to the front surface. For example, in some embodiments the mirror may be coupled to a door that is hingedly coupled to the front surface of the support structure 1001 similar to conventional cabinets such as medicine cabinets or other storage cabinets with a mirrored door.

The over-the-door hanging apparatus 1000 also comprises a first elongate member 1003 and a second elongate member (not illustrated) and a first pair of mounting elements 1004 and a second pair of mounting elements (not illustrated). Specifically, the first pair of mounting elements 1004 is secured to the rear surface 1002 of the support structure 1001 on a first side of a vertical centerline of the support structure 1000 and the second pair of mounting elements (not illustrated) is secured to the rear surface 1002 of the support structure 1001 on a second side of the vertical centerline of the support structure 100 that is opposite the first side. Because only one side of the over-the-door hanging apparatus 1000 is illustrated, only one of the elongate members and one of the pairs of mounting elements is illustrated. However, it should be appreciated that a second elongate member that is identical in structure to the first elongate member 1003 and a second pair of mounting elements that is identical in structure to the first pair of mounting elements 1004 are also included as a part of the over-the-door hanging apparatus 1000 similar to that which has been described in the previous embodiments.

The first pair of mounting elements 1004 (and also the second pair of mounting elements) is secured to the rear surface 1002 of the support structure 1001. The details of the first pair of mounting elements 1004 described below are applicable to the second pair of mounting elements that are not illustrated in the exemplified embodiment. In the exemplified embodiment, the first pair of mounting elements 1004 comprises a first mounting element 1005 and a second mounting element 1006. More specifically, in this embodiment the first mounting element 1005 is a first set screw that is screwed into the rear surface 1002 of the support structure 1001 and the second mounting element 1006 is a second set screw that is screwed into the rear surface 1002 of the support structure 1001. Of course, the first and second mounting elements 1005, 1006 may be other types of fasteners, including nails, rivets, bolts, pins, barbs, or the like (see, for example, FIG. 26 and the related description below). The first and second mounting elements 1005, 1006 may be secured to the rear surface 1002 of the support structure 1001 and then the first elongate member 1003 secured to the first and second mounting elements 1005, 1006 or the first elongate member 1003 may be placed adjacent/into contact with the rear surface 1002 of the support structure 1001 and then the first and second mounting elements 1005, 1006 used to couple the first elongate member 1003 to the support structure 1001. Thus, the first and second pairs of mounting elements 1004 may be secured to the rear surface 1002 of the support structure 1001 by the factory during manufacturing or by the user during assembly after purchase.

The first elongate member 1003 will be described below, it being understood that the same description is applicable to the second elongate member although it is not specifically illustrated in the figures for this particular embodiment. The first elongate member 1003 extends from a distal end 1007 to a proximal end 1008 and comprises a first surface 1009 and an opposite second surface 1010. The first elongate member 1003 comprises a plurality of mounting elements 1011 for mounting the first elongate member 1003 to the support structure 1001, and more specifically to the first pair of mounting elements 1004. The first elongate member 1003 also comprises a first bracket 1012 for engaging a top edge of a door as has been described above.

In the exemplified embodiment, the plurality of mounting elements 1011 comprises four separate multi-width apertures 1011*a-d* formed into the first elongate member 1003 in a vertically spaced apart manner. The multi-width apertures 1011*a-d* comprise a larger width portion that permits the head/flange of the first and second mounting elements 1005, 1006 of the first pair of mounting elements 1004 to pass therethrough and a smaller width portion that prevents the head of the first and second mounting elements 1005, 1006 of the first pair of mounting elements 1004 from passing therethrough. The smaller width portions of the multi-width apertures 1011*a-d* permit the stem portions of the first and second mounting elements 1005, 1006 of the first pair of mounting elements 1004 to pass therethrough.

Thus, referring collectively to FIGS. 21A and 21B, the first elongate member 1003 can be coupled to the first pair of mounting elements 1004 by inserting the heads of the first and second mounting elements 1005, 1006 of the first pair of mounting elements 1004 (which may be set screws or other fasteners as described above) through the larger width portion of two of the multi-width apertures 1011*a*, 1011*b* and then sliding the first elongate member 1003 relative to the support structure 1001 so that the stem portions of the first and second mounting elements 1005, 1006 of the first pair of mounting elements 1004 (which may be set screws or other fasteners as described above) enter into the smaller width portion of the multi-width apertures 1011*a*, 1011*b*. This prevents the first elongate member 1003 from being separated from the first pair of mounting elements 1004 unless the installation process including the sliding movement noted above is reversed.

Thus, the first and second elongate members 1003 are separate components from the support structure 1001. The first and second pairs of mounting elements 1004 are coupled to the rear surface 1002 of the support structure 1001 before the first and second elongate members 1003 are mounted to the support structure 1001. Specifically, the first and second elongate members 1003 are configured to be mounted to the support structure 1001 via engagement between the mounting elements 1011 of the first and second elongate members 1003 and the first and second pairs of mounting elements 1004.

Figure 22C:
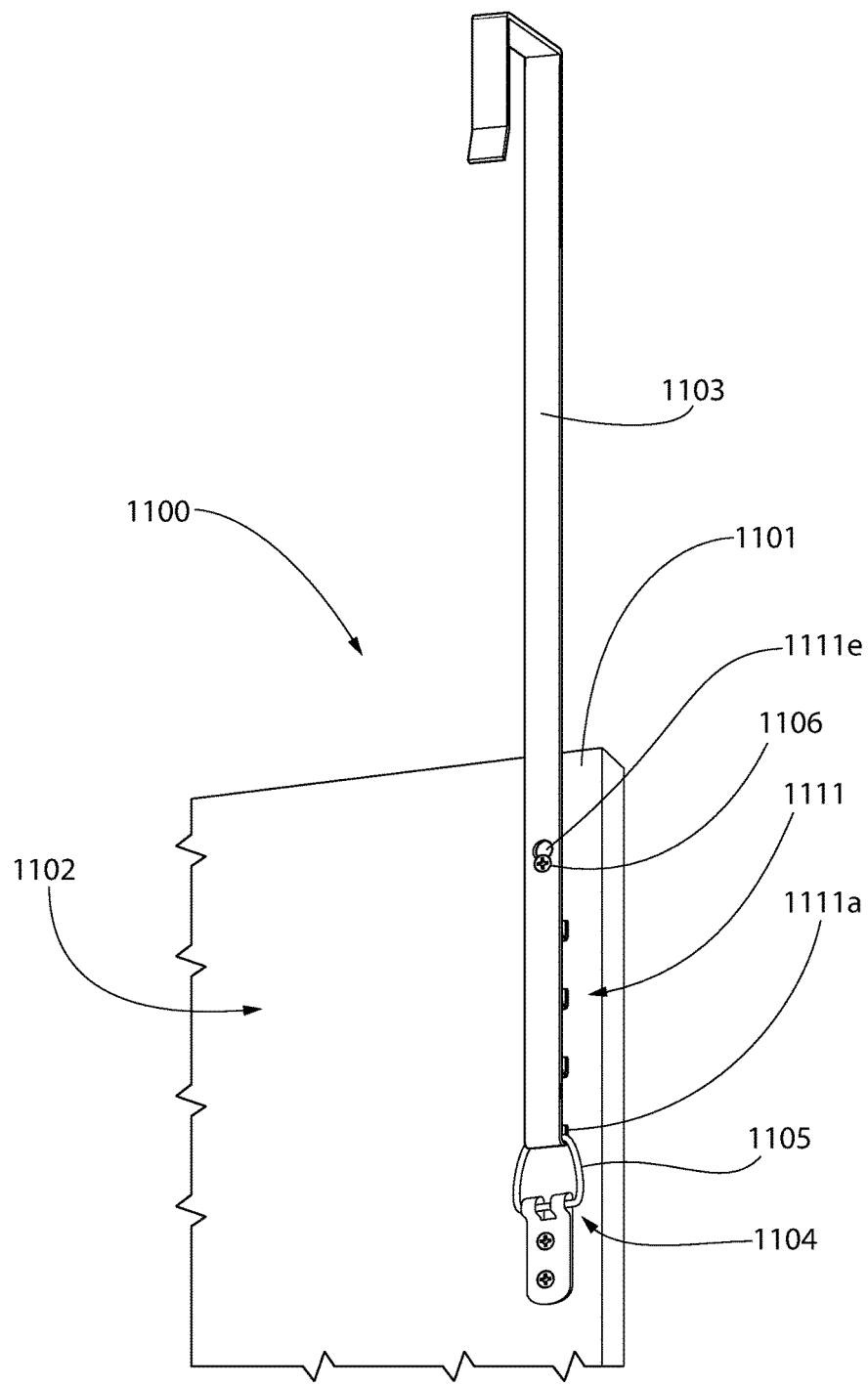
FIG. 22C is a perspective view of the portion of the over-the-door hanging apparatus of FIG. 22A with the elongate member and the mounting element in an attached state.

Referring now to FIGS. 22A-22C, another embodiment of an over-the-door hanging apparatus 1100 will be described. The over-the-door hanging apparatus 1100 generally comprises a support structure 1101 having a rear surface 1102, first and second elongate members 1103 (only the first elongate member is illustrated), and first and second pairs of mounting elements 1104 (only the first pair of mounting elements is illustrated). Similar to the embodiments described above, a mirror or other flat article may be coupled to the support structure 1101. As with the previously described embodiment of FIGS. 21A-21B, in this embodiment only one side of the apparatus 1100 and thus only one of the elongate members 1103 and one of the pairs of mounting elements 1104 is illustrated. However, it should be appreciated that a second elongate member and a second pair of mounting elements that are identical to the first elongate member 1103 and the first pair of mounting elements 1104 is provided on the opposite side of the over-the-door hanging apparatus 1100. In certain embodiments, the first pair of mounting elements 1104 and the second pair of mounting elements are located on opposite sides of a vertical centerline of the support structure 1101 as described above.

The first pair of mounting elements 1104 (and also the second pair of mounting elements) is secured to the rear surface 1102 of the support structure 1101. The details of the first pair of mounting elements 1104 described below are applicable to the second pair of mounting elements. In the exemplified embodiment, the first pair of mounting elements 1104 comprises a first mounting element 1105 and a second mounting element 1106. The first and second mounting elements 1105, 1106 of the first pair of mounting elements 1104 are vertically aligned and spaced apart from one another. In the exemplified embodiment, the first mounting element 1105 is a D-ring located on the rear surface 1102 of the support structure 1101 and the second mounting element 1106 is a set screw that is screwed into the rear surface 1102 of the support structure 1101. The D-ring may be coupled to the rear surface 1102 of the support structure 1101 via a bracket or plate member 1115. The set screw may be replaced with other fasteners such as those described above with reference to FIGS. 21A and 21B. In certain embodiments, the apparatus 1100 may only include the first mounting element 1105 and not also the second mounting element 1106, and thus the second mounting element 1106 (i.e., the set screw or equivalent) may be omitted in some embodiments. Although the second pair of mounting elements is not illustrated in the drawings, in some embodiments the first mounting element 1105 of the first pair of mounting elements 1104 is horizontally aligned with the first mounting element of the second pair of mounting elements and the second mounting element 1106 of the first pair of mounting elements 1104 is horizontally aligned with the second mounting element of the second pair of mounting elements.

The first elongate member 1103 extends from a proximal end 1107 to a distal end 1108 and comprises a first surface 1109 and an opposite second surface 1110. The first elongate member 1103 comprises a plurality of mounting elements 1111 for mounting to the support structure 1101 (and more specifically for mounting to the first pair of mounting elements 1104) and a first bracket 1112 for engaging a top edge of a door. The first bracket 1112 is located at the distal end 1108 of the first elongate member 1103. In the exemplified embodiment, the plurality of mounting elements 1111 extend from the first surface 1109 of the first elongate member 1103 and the first bracket 1112 extends from the second surface 1110 of the first elongate member 1103.

In the exemplified embodiment, the plurality of mounting elements 1111 comprises a first mounting element 1111*a*, a second mounting element 1111*b*, a third mounting element 1111*c*, a fourth mounting element 1111*d*, and a fifth mounting element 1111*e*. However, the number of the mounting elements 1111 is not to be limiting of the present invention in all embodiments and there may be more or less than that which is shown in the appended drawings. In the exemplified embodiment, each of the first through fourth mounting elements 1111*a-d* is a protrusion or hook that extends from the first surface 1109 of the first elongate member 1103 and the fifth mounting element 1111*e* is an aperture, and more specifically a multi-width aperture, that is formed through the first elongate member 1103.

In the exemplified embodiment, the fifth mounting element 1111*e* is formed into the main portion of the first elongate member 1103. However, in other embodiments the fifth mounting element 1111*e* may be an aperture that is formed into one of the first through fourth mounting elements 1111*a-d*. For example, the first elongate member 1103 may comprise the first mounting element 1111*a*, but it may be elongated relative to that which is illustrated so that it extends further vertically along the first elongate member 1103. In some embodiments, the aperture of the fifth mounting element 1111*e* may be formed into the first mounting element 1111*a*.

In the exemplified embodiment, the first mounting element 1111*a* is located at the proximal end 1107 of the first elongate member 1103. Furthermore, in the exemplified embodiment the fifth mounting element 1111*e* is located between the first mounting element 1111*a* and the proximal end 1108 of the first elongate member 1103. In some embodiments, the plurality of mounting elements 1111 may comprise only the first mounting element 1111*a* and the fifth mounting element 1111*e*. It should be appreciated that the use of the terms "first," "second," "third," and so on is merely intended to distinguish between the different mounting elements and is not otherwise intended to limit the scope of the application or claims. Thus, the phrase "first mounting element," "second mounting element," etc. in the claims may refer to any of the mounting elements 1111*a-e* described herein.

Referring to FIGS. 22A and 22C, the coupling of the first elongate member 1103 to the support structure 1101 via the first pair of mounting elements 1104 will be described, it being understood that this same description is applicable to the coupling of the second elongate member to the support structure 1101 via the second pair of mounting elements. The first elongate member 1103 is positioned adjacent the rear surface 1102 of the support structure 1101 so that the first mounting element 1111*a* of the first elongate member 1103 is aligned with the first mounting element 1105 of the first pair of mounting elements 1104 and the fifth mounting element 1111*e* of the first elongate member 1103 is aligned with the second mounting element 1106 of the first pair of mounting elements 1104. Of course, any one of the first through fourth mounting elements 1111*a-d* of the first elongate member 1103 may be aligned with the first mounting element 1105 depending on the desired hanging height of the over-the-door hanging apparatus 1100. The positioning/location of the second mounting element 1106 of the first pair of mounting elements 1104 may simply need to be changed to ensure that it is aligned with the fifth mounting element 1111*e* of the first elongate member 1103 depending on which of the first through fourth mounting elements 1111*a-d* of the first elongate member 1103 is to be coupled to the first mounting element 1105 of the first pair of mounting elements 1104. In some embodiments the second through fourth mounting elements 1111*b-d* may be omitted so that there is only the first mounting element 1111*a* and the fifth mounting element 1111*e* and no adjustability in the hanging height of the over-the-door hanging apparatus 1100.

Once aligned as described herein, the first mounting element 1111*a* of the first elongate member 1103 is engaged with the first mounting element 1105 such that the D-ring becomes positioned within a space between the first mounting element 1111*a* and the first surface 1109 of the first elongate member 1103. Simultaneously, the second mounting element 1106 enters into the larger width portion of the second mounting element 1106 of the first elongate member 1103. Next, the first elongate member 1103 is slid upwardly/vertically so that the second mounting element 1106 enters into the smaller width portion of the second mounting element 1106 and the D-ring becomes hooked onto/engaged with the first mounting element 1111a. This dual mount system prevents substantial movement of the first elongate member 1103 relative to the support structure 1101.

Referring to FIGS. 23A-23D, another embodiment of an over-the-door hanging apparatus 1200 will be described. The over-the-door hanging apparatus 1200 generally comprises a support structure 1201 having a rear surface 1202, first and second elongate members 1203 (only the first elongate member is illustrated, it being understood that the second elongate member is identical thereto), and first and second pairs of mounting elements 1204 (only the first pair of mounting elements is illustrated, it being understood that the second pair of mounting elements is identical but positioned on the opposite side of the support structure 1201 as has been discussed in the previous embodiments). As with the embodiments above with regard to FIGS. 21A-21B and 22A-22C, FIGS. 23A-23D only illustrate a portion of the over-the-door hanging apparatus 1200 sufficient to show the mount system for mounting the first and second elongate members 1203 to the support structure 1201 via the first and second pairs of mounting elements 1204.

As with the previously described embodiments, the first pair of mounting elements 1204 is coupled or secured to the rear surface 1202 of the support structure 1201. In this embodiment, the first pair of mounting elements 1204 comprises a first mounting element 1205 and a second mounting element 1206. In the exemplified embodiment, the first and second mounting elements 1205, 1206 are illustrated as separate and distinct elements. However, the invention is not to be so limited and the first and second mounting elements 1205, 1206 may be formed into a single mounting plate that is coupled to the rear surface 1202 of the support structure 1201. Each of the first and second mounting elements 1205, 1206 comprises a curved channel 1215.

The first elongate member 1203 extends from a distal end 1207 to a proximal end 1208 and comprises a first surface 1209 and an opposite second surface 1210. The first elongate member 1204 comprises first and second mounting elements 1211a, 1211b extending from the first surface 1209 and a first bracket 1212 extending from the second surface 1210. The first and second mounting elements 1211a, 1211b are hooks that are configured to cooperate with the first and second mounting elements 1205, 1206 of the first pair of mounting elements 1204 to mount the first elongate member 1203 to the support structure 1201. In the exemplified embodiment, the first mounting element 1211a is a hook that extends outwardly and downwardly towards the distal end 1207 of the first elongate member 1203 and the second mounting element 1206 is a hook that extends outwardly and upwardly towards the proximal end 1208 of the first elongate member 1203. However, the invention is not to be so limited in all embodiments and both of the first and second mounting elements 1211a, 1211b of the first elongate member 1203 may extend outwardly and upwardly towards the proximal end 1208 in other embodiments. The first bracket 1212 is configured to engage a top edge of a door to support the over-the-door hanging apparatus 1200 from the door.

Figure 23A:
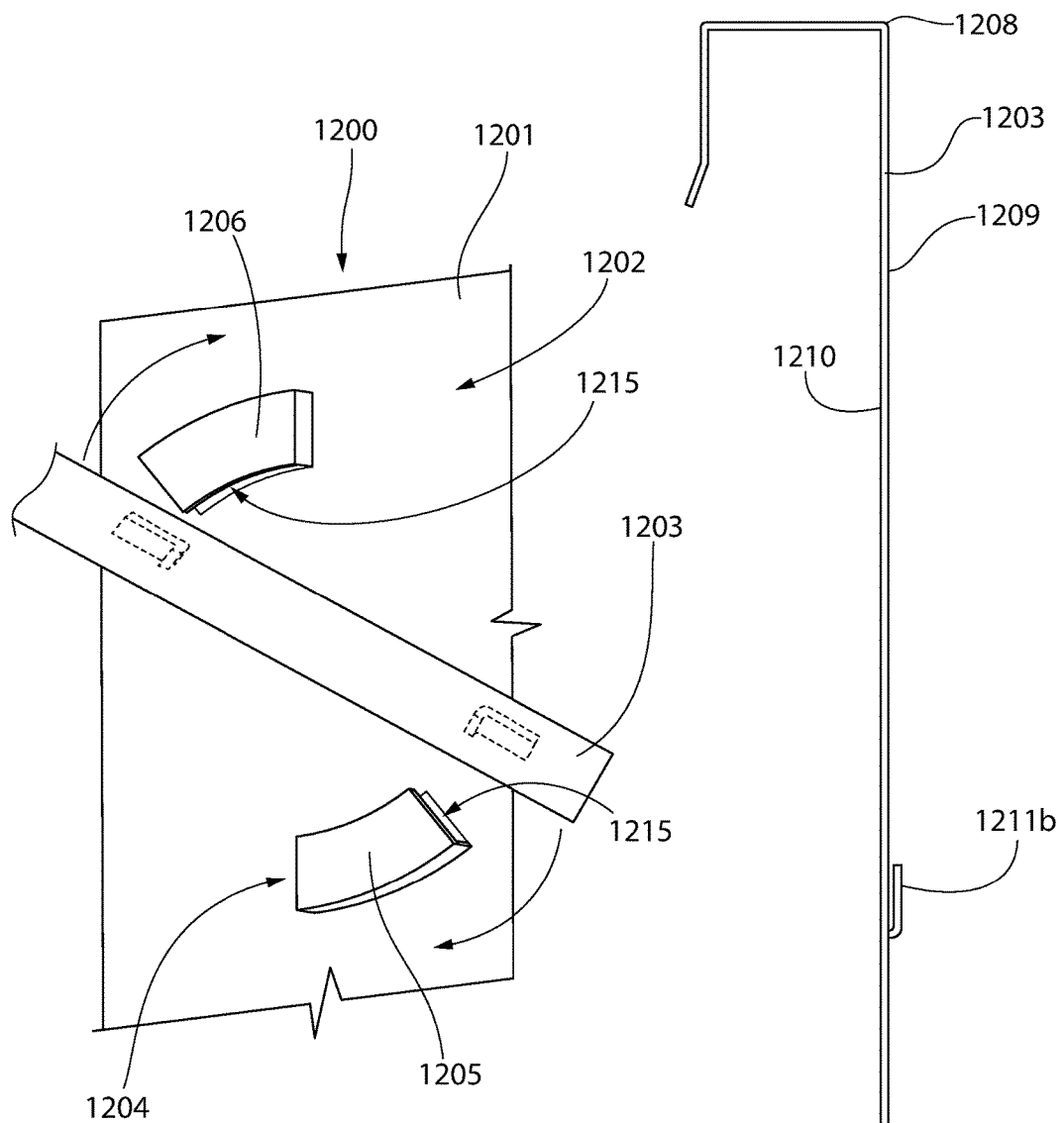
FIG. 23A is a plan view of a portion of an over-the-door hanging apparatus in accordance with a seventh embodiment of the present invention with an elongate member and a mounting element in a detached state.
Figure 23B:
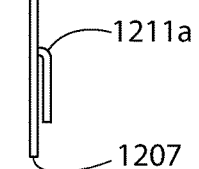
FIG. 23B is a side view of the elongate member of FIG. 23A.
Figure 23C:
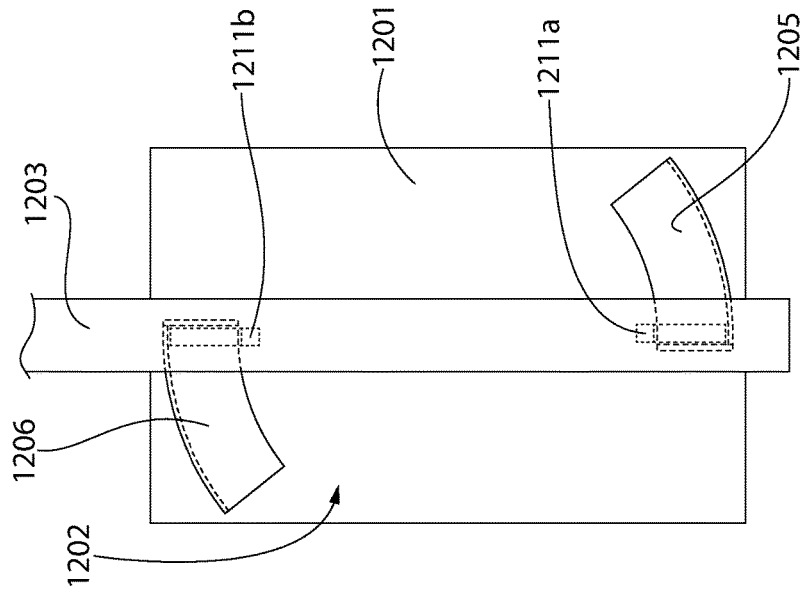
FIGS. 23C and 23D are plan views of the portion of the over-the-door hanging apparatus of FIG. 22A illustrating the manner of coupling the elongate member to the mounting element.
Figure 23D:
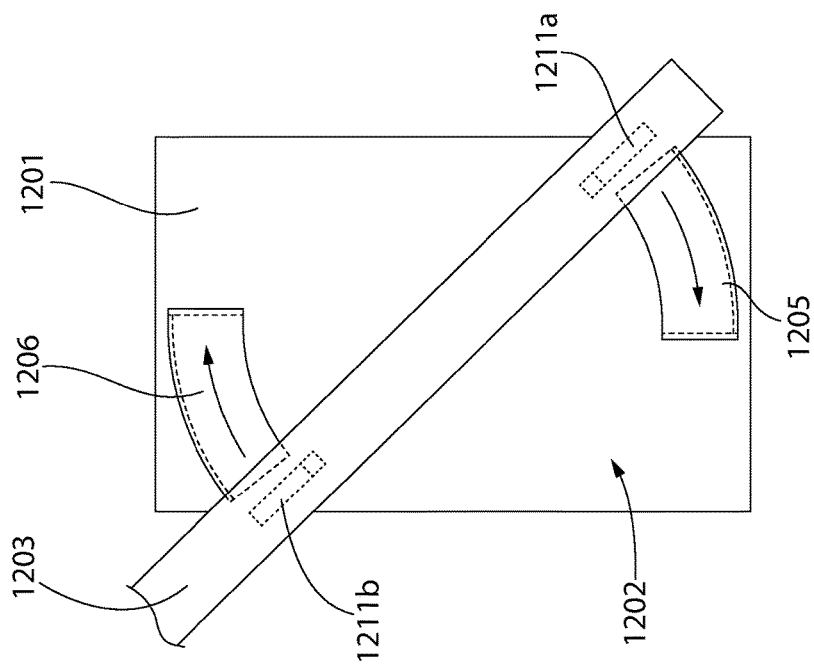

FIGS. 23C and 23D illustrate the manner of mounting the first elongate member 1203 to the support structure 1201 via the first and second mounting elements 1205, 1206 of the first pair of mounting elements 1204. The first elongate member 1203 is positioned adjacent to the first and second mounting elements 1205, 1206 of the first pair of mounting elements 1204 so that the first and second mounting elements 1211a, 1211b of the first elongate member 1203 are aligned with openings into the channels 1215 of the first and second mounting elements 1205, 1206 of the first pair of mounting elements 1204. Next, the first elongate member 1203 is rotated about an axis that is perpendicular to the first and second surfaces 1209, 1210 of the first elongate member 1203 so that the first mounting element 1211a of the first elongate member 1203 enters into the channel 1215 of the first mounting element 1205 and the second mounting element 1211b of the first elongate member 1203 enters into the channel 1215 of the second mounting element 1206. Thus, the main difference between this embodiment and those that were previously described is that the coupling is achieved via a rotational movement of the first elongate member 1203 relative to the support structure 1201. The same rotational technique is used for mounting the second elongate member to the second pair of mounting elements.

Figure 24A:
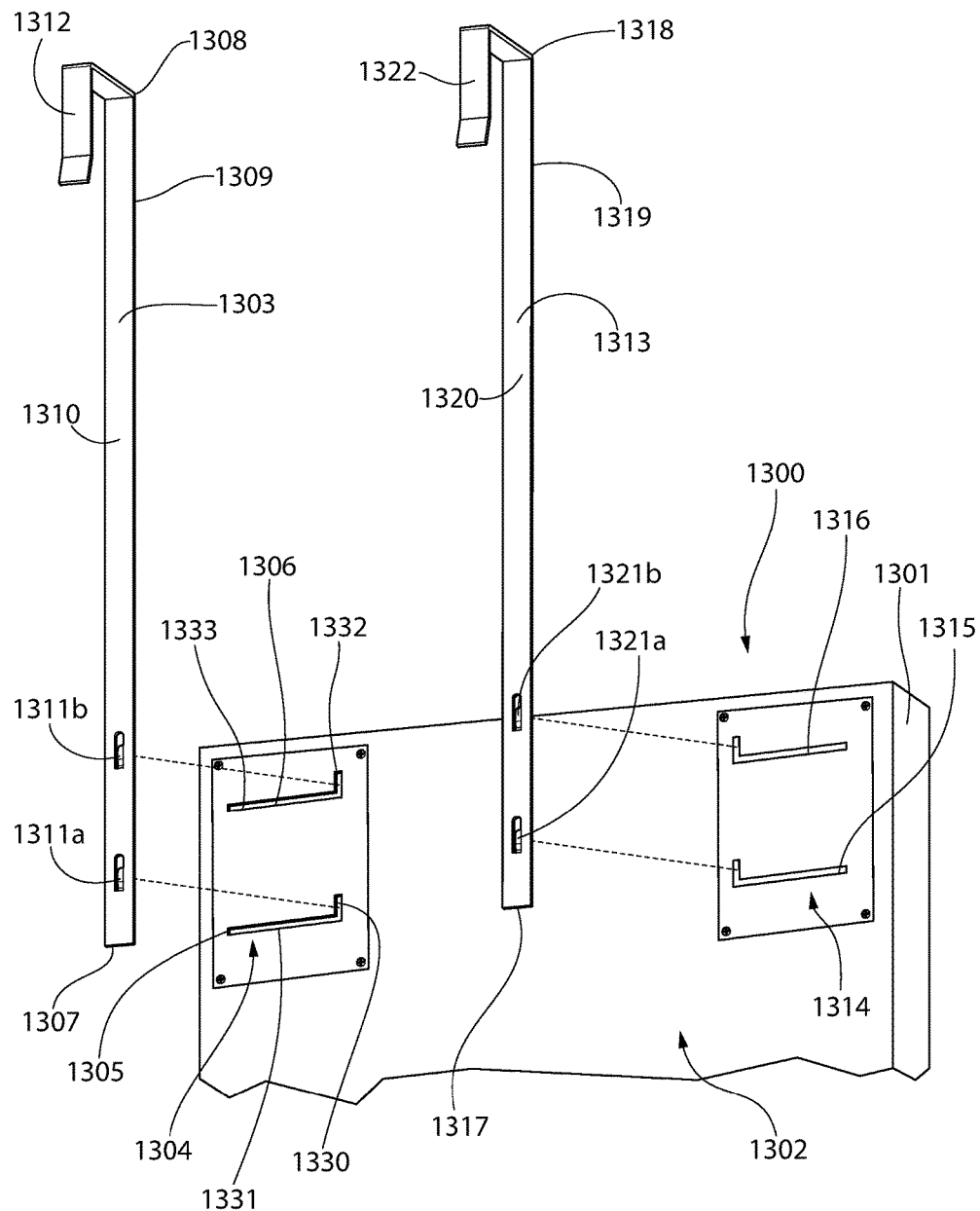
FIG. 24A is a plan view of a portion of an over-the-door hanging apparatus in accordance with an eighth embodiment of the present invention with an elongate member and a mounting element in a detached state.
Figure 24B:
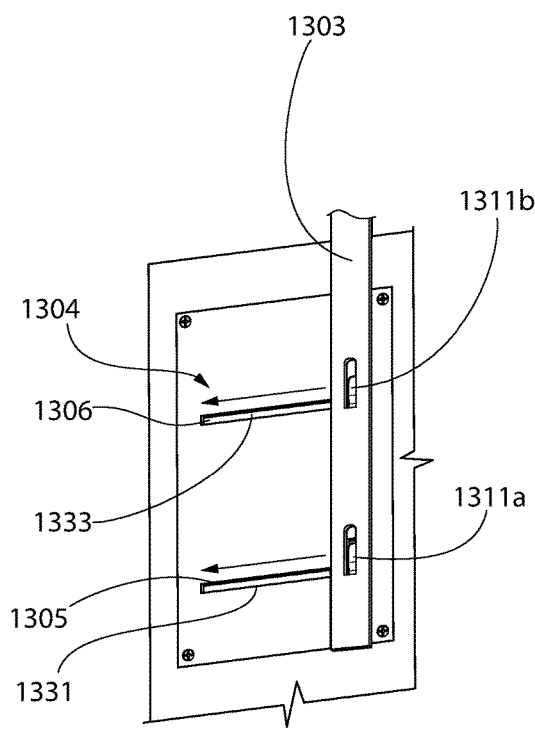
FIGS. 24B and 24C are plan views of the portion of the over-the-door hanging apparatus of FIG. 24A illustrating the manner of coupling the elongate member to the mounting element.
Figure 24C:
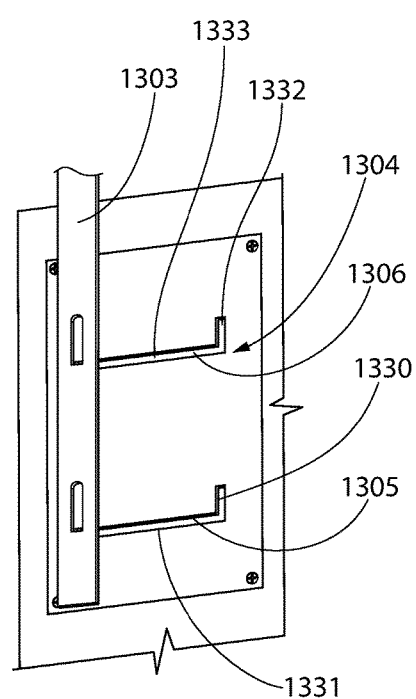

Referring to FIGS. 24A-24C concurrently, another embodiment of an over-the-door hanging apparatus 1300 will be described. The over-the-door hanging apparatus 1300 generally comprises a support structure 1301 having a rear surface 1302, first and second elongate members 1303, 1313, and first and second pairs of mounting elements 1304, 1314. As with the embodiments above with regard to FIGS. 21A-21B, 22A-22C, and 23A-23D, FIGS. 24A-2dC only illustrate a portion of the over-the-door hanging apparatus 1300 sufficient to show the mount system for mounting the first and second elongate members 1303, 1313 to the support structure 1301 via the first and second pairs of mounting elements 1304, 1314.

As with the previously described embodiments, the first and second pairs of mounting elements 1304, 1314 are coupled or secured to the rear surface 1302 of the support structure 1301 on opposite sides of a vertical centerline of the support structure 1301. In this embodiment, the first pair of mounting elements 1304 comprises a first mounting element 1305 and a second mounting element 1306 and the second pair of mounting elements 1314 comprises a first mounting element 1315 and a second mounting element 1316. In the exemplified embodiment, the first and second mounting elements 1305, 1306 of the first pair of mounting elements 1304 are positioned on a single plate and the first and second mounting elements 1315, 1316 of the first pair of mounting elements 1314 are positioned on a single plate. However, the invention is not to be limited in this regard in all embodiments.

The first elongate member 1303 extends from a distal end 1307 to a proximal end 1308 and comprises a first surface 1309 and an opposite second surface 1310. The first elongate member 1304 comprises first and second mounting elements 1311a, 1311b extending from the first surface 1309 and a first bracket 1312 extending from the second surface 1310. Of course, more than two mounting elements may extend from the first surface 1309 of the first elongate member 1304 in other embodiments. In the exemplified embodiment, the first and second mounting elements 1311a, 1311b are hooks that are configured to cooperate with the first and second mounting elements 1305, 1306 of the first pair of mounting elements 1304 to mount the first elongate member 1303 to the support structure 1301. In the exemplified embodiment, each of the first and second mounting elements 1311a, 1311b extends outwardly and upwardly towards the proximal end 1308 of the first elongate member 1303. The second elongate member 1313 extends from a distal end 1317 to a proximal end 1318 and comprises a first surface 1319 and an opposite second surface 1320. The second elongate member 1314 comprises first and second mounting elements 1321a, 1321b extending from the first surface 1319 and a second bracket 1322 extending from the second surface 1320. The first and second mounting elements 1321a, 1321b are hooks that are configured to cooperate with the first and second mounting elements 1315, 1316 of the second pair of mounting elements 1314 to mount the second elongate member 1313 to the support structure 1301. In the exemplified embodiment, each of the first and second mounting elements 1321a, 1321b extends outwardly and upwardly towards the proximal end 1308 of the first elongate member 1303. The first and second brackets 1312, 1322 are configured to engage a top edge of a door to support the over-the-door hanging apparatus 1300 from the door.

The first pair of mounting elements 1304, and specifically the first and second mounting elements 1305, 1306 of the first pair of mounting elements 1304, will now be described, it being understood that the same description applies to the second pair of mounting elements 1314. In the exemplified embodiment, the first pair of mounting elements 1304 is formed into a plate that is coupled to the rear surface 1302 of the support member 1301. However, the invention is not to be so limited in all embodiments and the first pair of mounting elements 1304 may be formed directly into the rear surface 1302 of the support member 1301 or each mounting element 1305, 1306 of the first pair of mounting elements 1304 may be formed into separate plates that are coupled to the rear surface 1302 of the support member 1301.

The first mounting element 1305 of the first pair of mounting elements 1304 comprises an entry region 1330 and a nesting region 1331. Similarly, the second mounting element 1306 of the first pair of mounting elements 1304 comprises an entry region 1332 and a nesting region 1333. The entry regions 1330, 1332 are vertically oriented channels that permit the first and second mounting elements 1311a, 1311b of the first elongate member 1303 to pass therethrough. The nesting regions 1331, 1333 are horizontally oriented channels.

Thus, as best illustrated in FIGS. 24B and 24C, the first elongate member 1303 is coupled to the support member 1301 (and more specifically to the first pair of mounting elements 1304) via a horizontal sliding motion. Specifically, first the first and second mounting elements 1311a, 1311b are aligned with and inserted into the entry regions 1330, 1332 of the first and second mounting elements 1305, 1306 of the first pair of mounting elements 1304. Next, the first elongate arm 1303 is slid horizontally relative to the support structure 1301 so that the first and second mounting elements 1311a, 1311b slide horizontally along/within the nesting regions 1331, 1333 of the first and second mounting elements 1305, 1306 of the first pair of mounting elements 1304. There is either a cutout formed into the rear surface 1302 of the support structure 1301 or the plate that contains the first pair of mounting elements 1304 is raised to provide a pocket or open space within which the first and second mounting elements 1311a, 1311b can nest. Thus, this embodiment utilizes a horizontal sliding motion between the first elongate arm 1303 and the support structure 1301 to mount the first elongate arm 1303 to the support structure 1301 via the first pair of mounting elements 1304.

Figure 25A:
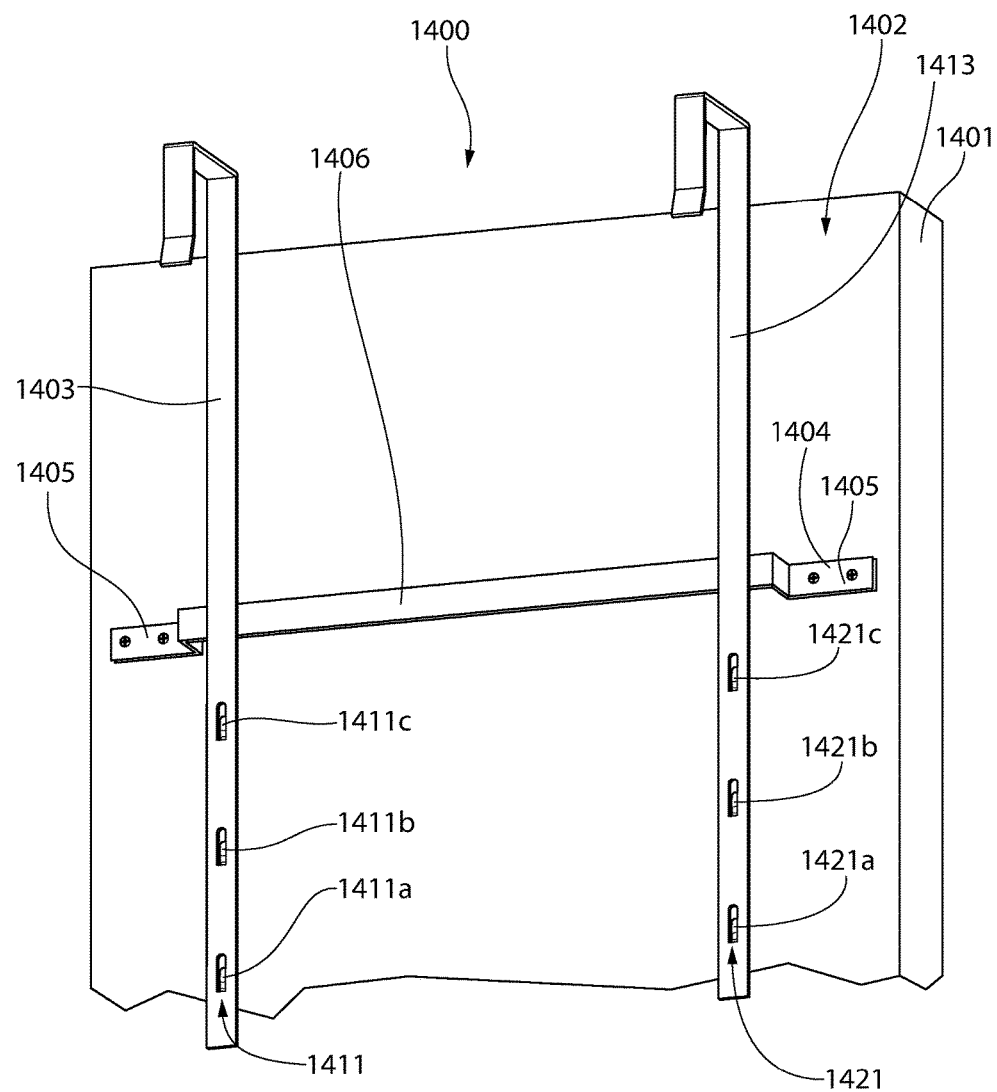
FIG. 25A is a perspective view of a portion of an over-the-door hanging apparatus in accordance with a ninth embodiment of the present invention with an elongate member and a mounting element in a detached state.
Figure 25B:
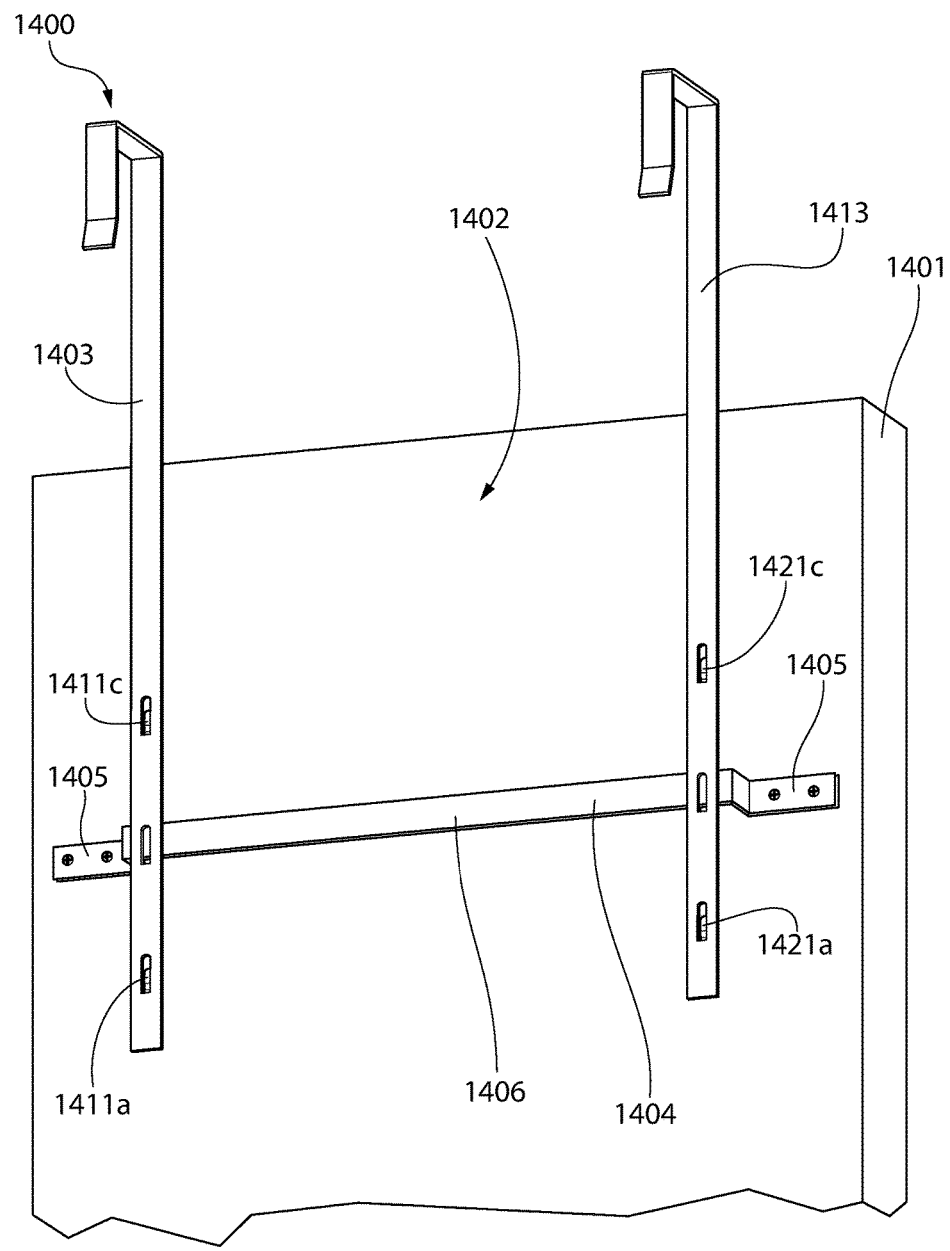
FIG. 25B is a perspective view of the portion of the over-the-door hanging apparatus of FIG. 25A with the elongate member and the mounting element in the attached state.

Referring to FIGS. 25A and 25B, another embodiment of an over-the-door hanging apparatus 1400 is illustrated and will be described. The over-the-door hanging apparatus 1400 generally comprises a support structure 1401 having a rear surface 1402 and a mirror or other flat article coupled to the support structure 1401, first and second elongate members 1403, 1413, and a mounting bracket 1404 secured or coupled to the rear surface 1402 of the support structure 1401. The first and second elongate members 1403, 1413 are similar in structure to the previously described first and second elongate members. Specifically, the first elongate member 1403 comprises a plurality of mounting elements 1411 (a first mounting element 1411a, a second mounting element 1411b, and a third mounting element 1411c) and a first bracket 1412. The second elongate member 1413 comprises a plurality of mounting elements 1421 (a first mounting element 1421a, a second mounting element 1421b, and a third mounting element 1421c) and a second bracket 1422.

The main difference in this embodiment relative to those previously described is that rather than having a mounting plate or pairs of mounting elements on the rear surface 1402 of the support structure 1401, there is a single mounting bracket 1404. The mounting bracket 1404 comprises first portions 1405 that are secured directly to the rear surface 1402 of the support structure 1401 and second portions 1406 that are raised relative to the rear surface 1402 of the support structure 1401. Thus, the first portions 1405 of the mounting bracket 1404 are in direct surface contact with the rear surface 1402 of the support structure 1401 to couple the mounting bracket 1404 to the support structure 1401 and the second portions 1406 of the mounting bracket 1404 are spaced apart from the rear surface 1402 of the support structure 1401. The mounting bracket 1404 extends horizontally along the rear surface 1402 of the support structure 1401 transverse to a vertical centerline of the support structure 1401. The first portions 1405 of the mounting bracket 1404 are on opposing ends of the mounting bracket 1404 and the second portion 1406 of the mounting bracket 1404 extends between the first portions 1405 of the mounting bracket.

FIG. 25A illustrates the first and second elongate members 1403, 1413 detached from the mounting bracket 1404 and FIG. 25B illustrates the first and second elongate members 1403, 1413 attached or mounted to the mounting bracket 1404. To mount the first elongate arm 1403 to the mounting bracket 1404, one of the first, second, and third mounting elements 1411a-c of the first elongate arm 1403 (which may be hooks as described herein above) is aligned with a bottom edge of the raised portion 1406 of the mounting bracket 1404. The first elongate member 1403 is then slid vertically to trap the raised portion 1406 of the mounting bracket 1404 within the slot or space formed by the mounting element 1411a-c being used. Any of the first, second, and third mounting elements 1411a-c may be used depending on the desired hanging height of the support structure 1401. Specifically, if the first mounting element 1411a is used, the support structure 1401 will hang lower and if the third mounting element 1411c is used the support structure will hang higher. The same technique is used for mounting the second elongate member 1413 to the mounting bracket 1404. In FIG. 25B, the second mounting elements 1411b, 1421b of the first and second elongate members 1403, 1413 are used in the mounting.

Although only a single mounting bracket 1404 is used in the exemplified embodiment, in alternative embodiments a second mounting bracket may also be coupled to the rear surface 1402 of the support structure 1401 at a vertical position above or below the mounting bracket 1404. When two mounting brackets are used, two of the mounting elements 1411a-c, 1421a-c of the first and second elongate embers 1403, 1413 will engage with mounting brackets simultaneously, resulting in a more secure attachment between the first and second elongate members 1403, 1413 and the support structure 1401, allowing less potential movement of the support structure 1401 when it is hanging from a door as described herein above.

Figure 25C:
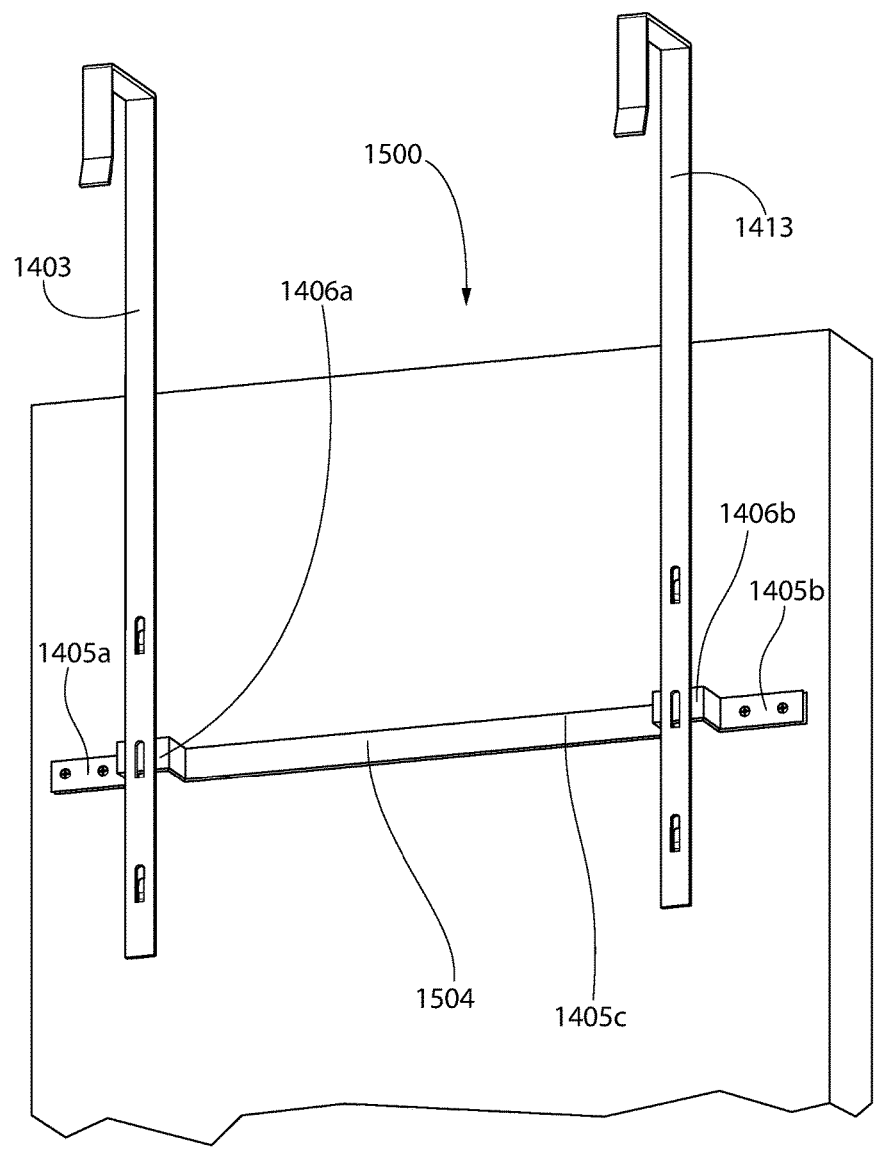
FIG. 25C is a perspective view of the portion of the over-the-door hanging apparatus of FIG. 25B illustrating an alternative embodiment of the mounting element.

FIG. 25C illustrates an embodiment of an over-the-door hanging apparatus 1500 that is similar to the over-the-door hanging apparatus 1400 of FIGS. 25A and 25B except as described herein below. Thus, the description above with regard to the over-the-door hanging apparatus 1400 is applicable to this embodiment except for the differences specifically described below. In this embodiment, the mounting bracket 1504 has two raised portions 1406a, 1406b and three non-raised portions 1405a-c. The non-raised portion 1405c is positioned and extends in between the two raised portions 1406a, 1406b. Thus, in this embodiment the raised portions 1406a, 1406b are reduced in length relative to the raised portion 1406 of the over-the-door hanging apparatus 1400. This will reduce horizontal sliding of the first and second elongate members 1403, 1413 when the first and second elongate members 1403, 1413 are mounted to the mounting bracket 1504.

Figure 25D:
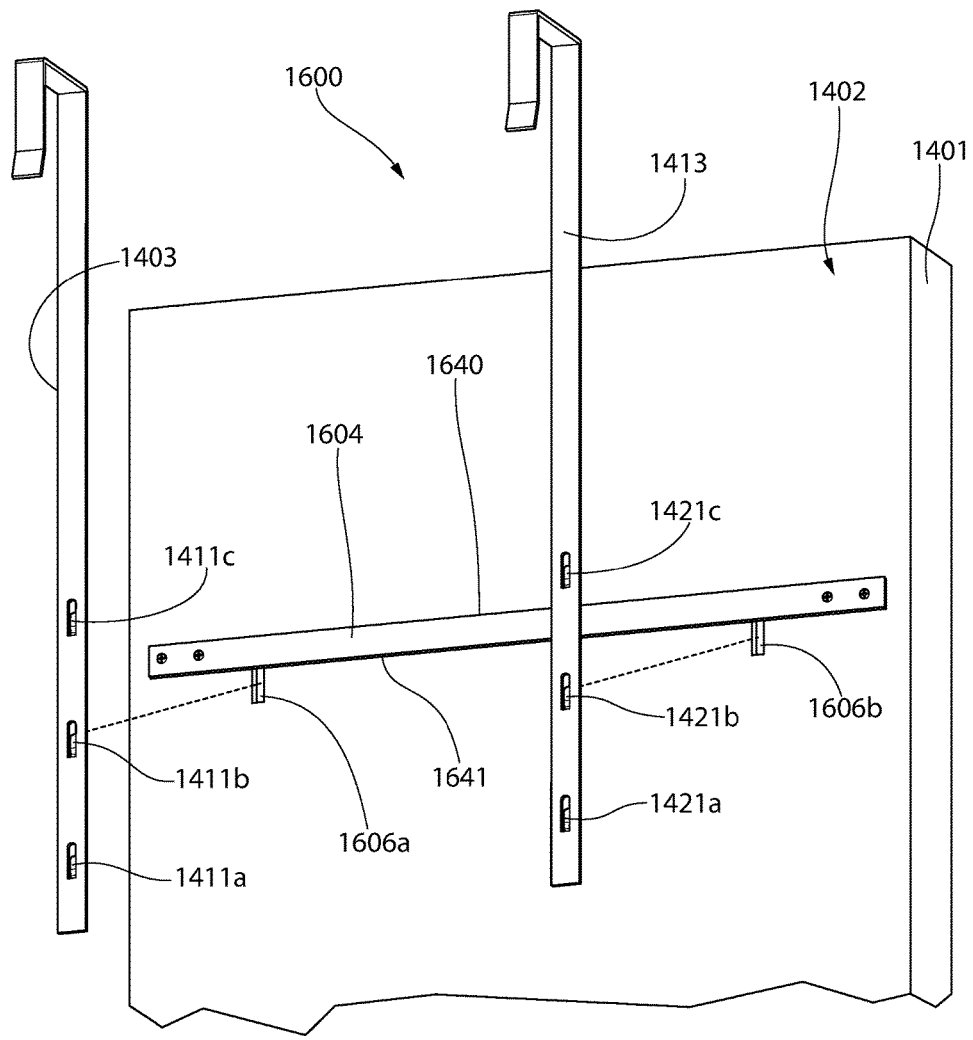
FIG. 25D is a perspective view of the portion of the over-the-door hanging apparatus of FIG. 25A illustrating still another alternative embodiment of the mounting element with the elongate member and the mounting element in a detached state.
Figure 25E:
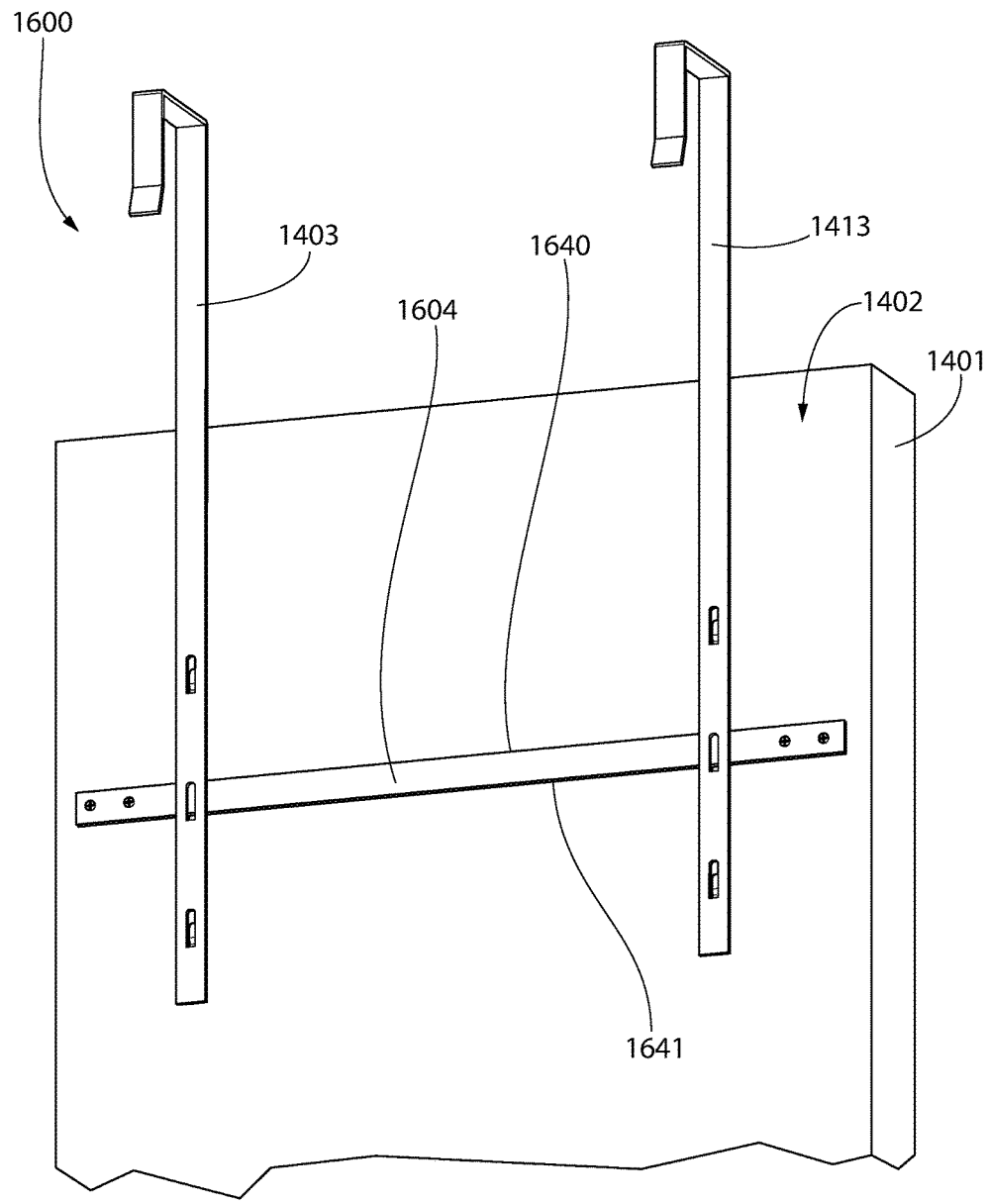
FIG. 25E is a perspective view of the over-the-door hanging apparatus of FIG. 25D with the mounting element and the elongate member in an attached state.

FIGS. 25D and 25E illustrate still another embodiment of an over-the-door hanging apparatus 1600 that is similar to the over-the-door hanging apparatus 1400 of FIGS. 25A and 25B except as described herein below. Thus, the description above with regard to the over-the-door hanging apparatus 1400 is applicable to this embodiment except for the differences specifically described below. In this embodiment, the mounting bracket 1604 is a generally flat, planar structure extending across the width of the support structure 1401. However, in this embodiment there are two cutouts 1606a, 1606b formed into the rear surface 1402 of the support structure 1401 from a location adjacent a top edge 1640 of the mounting bracket 1604 vertically downwardly beyond a bottom edge 1641 of the mounting bracket 1604.

To mount the first elongated member 1403 to the mounting bracket 1604, one of the mounting elements 1411a-c of the first elongated member 1403 is inserted into the cutout 1606a, and then the first elongated member 1403 is slid upwardly. Similarly, to mount the second elongated member 1413 to the mounting bracket 1604, one of the mounting elements 1421a-c of the second elongated member 1413 is inserted into the cutout 1606b, and then the second elongated member 1413 is slid upwardly.

Figure 26:
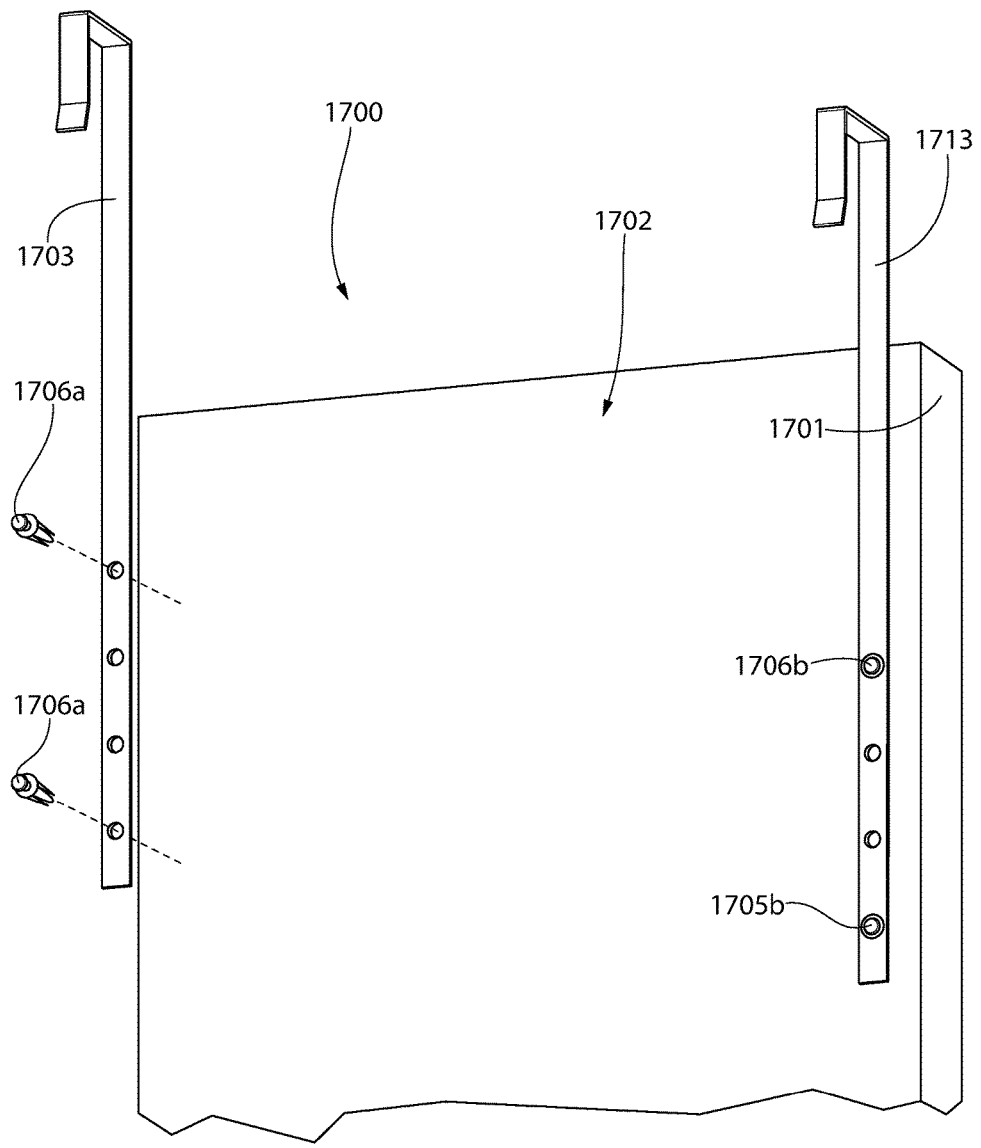
FIG. 26 is a perspective view of an over-the-door hanging apparatus in accordance with a tenth embodiment of the present invention with one elongate member in an attached state and another elongate member in a detached state.

Referring to FIG. 26, another embodiment of an over-the-door hanging apparatus 1700 is illustrated. The over-the-door hanging apparatus 1700 is similar to the over-the-door hanging apparatus 1000 of FIGS. 21A and 21B except that instead of using set screws as the mounting elements that are secured to the rear surface 1702 of the support structure 1701 and to which the first and second elongated members 1703, 1713 are mounted to the support structure 1701, barbs 1705a, 1705b, 1706a, 1706b are used. Thus, the first and second elongated members 1703, 1713 may be aligned with the rear surface 1702 of the support structure 1701 as desired, and then the barbs may be inserted into through-holes (i.e., mounting elements) formed into the first and second elongated members 1703, 1713. The material and construction of the barbs 1705a, 1705b, 1706a, 1706b and the material of the support structure 1701 may be such that the barbs 1705a, 1705b, 1706a, 1706b are able to be press fit into the support structure 1701 with the force of a user's hand or thumb/fingers. Alternatively, the rear surface 1702 of the support structure 1701 may include pre-drilled holes into which the barbs 1705a, 1705b, 1706a, 1706b may be press-fit to secure the first and second elongate members 1703, 1713 to the support structure 1701. This embodiment may be used in combination with a plate (not shown) that is affixed to the rear surface 1702 of the support structure 1701 or without such a plate as shown in the exemplified embodiment.

Rather than barbs 1705a, 1705b, 1706a, 1706b, any type of fastener (bolts, rivets, screws, eye lags, etc.) may be used. Alternatively, the elongated members 1703, 1713 may be secured to the rear surface 1702 of the support structure 1701 using adhesive, hook-and-loop fasteners, or the like.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An over-the-door hanging apparatus comprising:
  a support structure extending along a longitudinal axis and having a rear surface;
  a first mounting element pair coupled to the rear surface of the support structure, the first mounting element pair comprising a first mounting element and a second mounting element, each of the first and second mounting elements comprising a curved channel;
  a first elongate member comprising a first surface, an opposite second surface, a first mounting element and a second mounting element protruding from the first surface of the first elongate member, and a first bracket protruding from the second surface of the first elongate member for engaging a top edge of a door;
  the support structure and the first elongate member coupled together by simultaneously: (1) rotating the first mounting element of the first elongate member through the curved channel of the first mounting element of the first mounting element pair; and (2) rotating the second mounting element of the first elongate member through the curved channel of the second mounting element of the first mounting element pair.

2. The over-the-door hanging apparatus according to claim 1 wherein the first mounting element pair is coupled to the rear surface of the support structure on a first side of the longitudinal axis and further comprising a second mounting element pair coupled to the rear surface of the support structure on a second side of the longitudinal axis.

3. The over-the-door hanging apparatus according to claim 2 wherein the second mounting element pair comprises a third mounting element and a fourth mounting element, each of the third and fourth mounting elements comprising a curved channel.

4. The over-the-door hanging apparatus according to claim 3 further comprising a second elongate member comprising a first surface, an opposite second surface, a first mounting element and a second mounting element protruding from the first surface of the second elongate member, and a second bracket protruding from the second surface of the second elongate member for engaging the top edge of the door, the support structure and the second elongate member coupled together by simultaneously: (1) rotating the first mounting element of the second elongate member through the curved channel of the third mounting element of the second mounting element pair; and (2) rotating the second mounting element of the second elongate member through the curved channel of the fourth mounting element of the second mounting element pair.

5. The over-the-door hanging apparatus according to claim 1 wherein the first mounting element pair is formed as a single mounting plate that is coupled to the rear surface of the support structure.

6. The over-the-door hanging apparatus according to claim 1 wherein a concave side of the curved channel of the first mounting element of the first mounting element pair faces a concave side of the curved channel of the second mounting element of the first mounting element pair.

7. The over-the-door hanging apparatus according to claim 1 wherein the curved channels of the first and second mounting elements of the first mounting element pair comprise an entry section and a nesting section, wherein the nesting sections are aligned along a reference plane that is perpendicular to the rear surface of the support structure, and wherein the entry sections are located on opposite sides of the reference plane.

8. The over-the-door hanging apparatus according to claim 7 wherein the first mounting element of the first mounting element pair comprises an open bottom end and an open first side and a closed top end and a closed second side and the second mounting element of the first mounting element pair comprises an open top end and an open first side and a closed bottom and a closed second side.

9. The over-the-door hanging apparatus according to claim 1 wherein coupling the first elongate member and the support structure comprises aligning the first mounting element of the first elongate member with an opening into the curved channel of the first mounting element of the first mounting element pair and aligning the second mounting element of the first elongate member with an opening into the curved channel of the second mounting element of the first mounting element pair and rotating one of the support structure and the first elongate member about an axis that is perpendicular to the rear surface of the support structure so that the first mounting element of the first elongate member enters into the curved channel of the first mounting element of the first mounting element pair and the second mounting element of the first elongate member simultaneously enters into the curved channel of the second mounting element of the first mounting element pair.

10. The over-the-door hanging apparatus according to claim 1 further comprising a mirror coupled to the support structure.

11. An over-the-door hanging apparatus comprising:
a support structure extending along a longitudinal axis and having a rear surface;
a first mounting element pair coupled to the rear surface of the support structure, the first mounting element pair comprising a first mounting element and a second mounting element, each of the first and second mounting elements comprising a horizontally elongated channel;
a first elongate member comprising a first surface, an opposite second surface, a first mounting element and a second mounting element protruding from the first surface of the first elongate member, and a first bracket protruding from the second surface of the first elongate member for engaging a top edge of a door;
the support structure and the first elongate member coupled together by: (1) inserting the first mounting element of the first elongate member into the horizontally elongated channel of the first mounting element of the first mounting element pair and inserting the second mounting element of the first elongate member into the horizontally elongated channel of the second mounting element of the first mounting element pair; and (2) horizontally translating one of the first elongate member and the support structure relative to the other so that the first and second mounting elements of the first elongate member move horizontally within the horizontally elongated channels.

12. The over-the-door hanging apparatus according to claim 11 wherein the first mounting element pair is coupled to the rear surface of the support structure on a first side of the longitudinal axis and further comprising a second mounting element pair coupled to the rear surface of the support structure on a second side of the longitudinal axis.

13. The over-the-door hanging apparatus according to claim 12 wherein the second mounting element pair comprises a third mounting element and a fourth mounting element, each of the third and fourth mounting elements comprising a horizontally elongated channel.

14. The over-the-door hanging apparatus according to claim 13 further comprising a second elongate member comprising a first surface, an opposite second surface, a first mounting element and a second mounting element protruding from the first surface of the second elongate member, and a second bracket protruding from the second surface of the second elongate member for engaging the top edge of the door, the support structure and the second elongate member coupled together by: (1) inserting the first mounting element of the second elongate member into the horizontally elongated channel of the third mounting element of the second mounting element pair and inserting the second mounting element of the second elongate member into the horizontally elongated channel of the fourth mounting element of the second mounting element pair; and (2) horizontally translating one of the second elongate member and the support structure relative to the other so that the first and second mounting elements of the second elongate member move horizontally within the horizontally elongated channels.

15. The over-the-door hanging apparatus according to claim 11 wherein each of the first and second mounting elements of the first mounting element pair comprises a vertically elongated channel spatially coupled to the horizontally elongated channel, and wherein the first and second mounting elements of the first elongate member pass through the vertically elongated channels before being moved horizontally into and within the horizontally elongated channels of the first and second mounting elements of the first mounting element pair.

16. The over-the-door hanging apparatus according to claim 15 wherein the vertically elongated channels and the horizontally elongated channels of each of the first and second mounting elements forms an L-shaped channel, and wherein the vertically elongated channels form entry portions of the L-shaped channels that permit insertion of the first and second mounting elements of the first elongate member and the horizontally elongated channels form nesting portions of the L-shaped channels that maintains the coupling between the first elongate member and the support structure.

17. The over-the-door hanging apparatus according to claim 11 wherein the first mounting element pair is formed as a single mounting plate that is coupled to the rear surface of the support structure.

18. An over-the-door hanging apparatus comprising:
a support structure extending along a longitudinal axis and having a rear surface;
a mounting bracket coupled to the rear surface of the support structure, the mounting bracket having an upper edge and a lower edge and being elongated in a direction transverse to the longitudinal axis of the support structure;
a first elongate member comprising a first surface, an opposite second surface, at least one mounting element protruding from the first surface of the first elongate member, and a first bracket protruding from the second surface of the first elongate member for engaging a top edge of a door; and
the support structure slidably mounted to the mounting bracket through mating between the at least one mounting element of the first elongate member and the lower edge of the mounting bracket.

19. The over-the-door hanging apparatus according to claim 18 wherein the mounting bracket comprises a first portion and a second portion that are secured to the rear surface of the support structure on opposite sides of the longitudinal axis and a third portion that is spaced from the rear surface of the support structure, the third portion extending between the first and second portions, and wherein the support structure is slidably mounted to the mounting bracket through mating between the at least one mounting element of the first elongate member and the third portion of the mounting bracket.

20. The over-the-door hanging apparatus according to claim 18 wherein the mounting bracket has a flat surface in contact with the rear surface of the support member, and further comprising at least one cutout formed into the rear surface of the support member extending from a location adjacent a top edge of the mounting bracket downwardly beyond a bottom edge of the mounting bracket, and wherein the at least one mounting element of the first elongate member is inserted into the at least one cutout and then slid upwardly in a direction of the longitudinal axis until it contacts the lower edge of the mounting bracket to mount the support structure to the mounting bracket.

* * * * *

UNITED STATES PATENT AND TRADEMARK OFFICE
CERTIFICATE OF CORRECTION

PATENT NO. : 9,622,600 B2
APPLICATION NO. : 15/297291
DATED : April 18, 2017
INVENTOR(S) : Matthew S. Kressin and Michael Lee Pyle It is certified that error appears in the above-identified patent and that said Letters Patent is hereby corrected as shown below:

In the Claims

Column 31, Lines 10-11, the text "mounting bracket" should be changed to --first elongate member--

Signed and Sealed this
Twenty-third Day of May, 2023

Katherine Kelly Vidal
*Director of the United States Patent and Trademark Office*